US012643987B2

(12) United States Patent
Cho et al.

(10) Patent No.: US 12,643,987 B2
(45) Date of Patent: Jun. 2, 2026

(54) EXTRACTANT AND EXTRACTION METHOD FOR REMOVING COLOR-EXPRESSING FOREIGN SUBSTANCES FROM COLORED POLYMER CONTAINING ESTER FUNCTIONAL GROUP, AND METHOD FOR CHEMICALLY SELECTING POLYMER CONTAINING ESTER FUNCTIONAL GROUP FROM COLORED POLYMER MIXTURE

(71) Applicant: KOREA RESEARCH INSTITUTE OF CHEMICAL TECHNOLOGY, Daejeon (KR)

(72) Inventors: Joungmo Cho, Daejeon (KR); Ye Rim Jo, Daejeon (KR); Thi Hong Ngan Le, Daejeon (KR)

(73) Assignee: Korea Research Institute Of Chemical Technology, Daejeon (KR)

( * ) Notice: Subject to any disclaimer, the term of this patent is extended or adjusted under 35 U.S.C. 154(b) by 138 days.

(21) Appl. No.: 18/556,486

(22) PCT Filed: May 3, 2022

(86) PCT No.: PCT/KR2022/006330

§ 371 (c)(1),
(2) Date: Oct. 20, 2023

(87) PCT Pub. No.: WO2022/235051

PCT Pub. Date: Nov. 10, 2022

(65) Prior Publication Data

US 2024/0360292 A1 Oct. 31, 2024

(30) Foreign Application Priority Data

May 3, 2021 (KR) ........................ 10-2021-0057224
Apr. 22, 2022 (KR) ........................ 10-2022-0050328

(51) Int. Cl.
*C08J 11/08* (2006.01)
*B01D 11/02* (2006.01)
(Continued)

(52) U.S. Cl.
CPC ........... *C08J 11/08* (2013.01); *B01D 11/0288* (2013.01); *B29B 17/02* (2013.01); *C08J 11/22* (2013.01);
(Continued)

(58) Field of Classification Search
None
See application file for complete search history.

(56) References Cited

U.S. PATENT DOCUMENTS

2009/0133200 A1 5/2009 Mukai et al.
2015/0059103 A1 3/2015 Liu et al.
(Continued)

FOREIGN PATENT DOCUMENTS

CA 2373452 A1 11/2000
CN 104730004 A 6/2015
(Continued)

OTHER PUBLICATIONS

English machine translation of Keh et al. (WO 2019/047175 A1) accessed online from Espacenet; PDF pp. 1-15. (Year: 2019).*
(Continued)

*Primary Examiner* — Katie L. Hammer
(74) *Attorney, Agent, or Firm* — HARNESS, DICKEY & PIERCE, P.L.C.

(57) ABSTRACT

A method for removing disperse die from a colored polymer containing an ester functional group may include heating an extractant to a temperature of 70° C. to 200° C. and bringing the extractant into direct contact with the colored polymer containing the ester functional group, thereby eluting the disperse die from the colored polymer containing the ester
(Continued)

functional group, and recovering the extractant from an extraction mixed solution by a method comprising distillation. The extraction mixed solution may include the extractant and an extracted portion of the color-expressing foreign substances. The extractant may include one or more compounds represented by at least one of Formula 1 or Formula 2. Formulas 1 and 2 are described in the specification.

8 Claims, 6 Drawing Sheets

(51) Int. Cl.

| | |
|---|---|
| ***B29B 17/02*** | (2006.01) |
| ***C08J 11/22*** | (2006.01) |
| ***C08J 11/24*** | (2006.01) |
| ***D06L 4/00*** | (2017.01) |

(52) U.S. Cl.

CPC ................ *C08J 11/24* (2013.01); *D06L 4/00* (2017.01); *C08J 2301/02* (2013.01); *C08J 2333/04* (2013.01); *C08J 2367/00* (2013.01); *C08J 2367/02* (2013.01); *C08J 2377/00* (2013.01); *C08J 2389/04* (2013.01); *Y02W 30/62* (2015.05)

(56) References Cited

U.S. PATENT DOCUMENTS

| | | | |
|---|---|---|---|
| 2019/0345306 | A1 | 11/2019 | Walker |
| 2020/0190280 | A1 | 6/2020 | Lin et al. |

FOREIGN PATENT DOCUMENTS

| | | | | | |
|---|---|---|---|---|---|
| JP | 2002-167357 | A | | 6/2002 | |
| JP | 2007-045874 | A | | 2/2007 | |
| JP | 6659919 | B1 | | 3/2020 | |
| KR | 10-2020-0099200 | A | | 8/2020 | |
| WO | WO-2013182801 | A1 | | 12/2013 | |
| WO | WO-2019047175 | A1 | * | 3/2019 | .............. C08J 11/04 |
| WO | 2020/058679 | A1 | | 3/2020 | |
| WO | 2021013849 | A1 | | 1/2021 | |

OTHER PUBLICATIONS

Partial Supplementary European Search Report dated Jul. 9, 2025 for corresponding European Patent Application No. 22799094.2.
Autext Research Journal, 19(2), 201-209 (2019).
International Search Report for International Application No. PCT/k2022/006330 dated May 3, 2021.
Extended European Search Report dated Oct. 13, 2025 for corresponding European Patent Application No. 22799094.2.

* cited by examiner

COLORED POLYMER MIXTURE BEFORE BLEACHING

COLORED/COLORLESS POLYMER MIXTURE AFTER BLEACHING

SELECTED POLYESTER AFTER BLEACHING

EXTRACTANT AND EXTRACTION METHOD FOR REMOVING COLOR-EXPRESSING FOREIGN SUBSTANCES FROM COLORED POLYMER CONTAINING ESTER FUNCTIONAL GROUP, AND METHOD FOR CHEMICALLY SELECTING POLYMER CONTAINING ESTER FUNCTIONAL GROUP FROM COLORED POLYMER MIXTURE

CROSS-REFERENCE TO RELATED APPLICATIONS

This application is a national phase under 35 U.S.C. § 371 of PCT International Application No. PCT/KR2022/006330 which has an International filing date of May 3, 2022 which claims priority to Korean Application No. 10-2021-0057224 filed May 3, 2021 and Korean Application No. 10-2022-0050328 filed Apr. 22, 2022 the entire contents of each of which are hereby incorporated by reference.

TECHNICAL FIELD

Proposed are an extractant and extraction method for removing color-expressing foreign substances from a colored polymer containing an ester functional group and a method for chemically selecting a polymer containing an ester functional group from a colored polymer mixture. More specifically, proposed are an extractant capable of effectively removing foreign substances, such as dyes and pigments, from a colored polymer containing an ester functional group and showing colors based on the foreign substances, a method for eluting most color-expressing foreign substances by bringing the extractant into contact with a colored polymer containing an ester functional group while maintaining a predetermined temperature range, and to a method for effectively selecting a polymer containing an ester function group free of foreign substances through color differentiation after adding the extractant to a colored polymer mixture to selectively elute the foreign substances only from a colored polymer containing an ester functional group.

BACKGROUND ART

With industrial developments, the increased amounts of synthetic fibers and plastics used are causing various environmental and social problems. Recently, to solve these problems, physical or chemical recycling technologies based on waste fibers or waste plastic materials, discharged after use, as raw materials have been receiving a lot of attention. Among waste fibers or waste plastics, colored polymeric materials containing ester functional groups have thermoplastic properties and can be converted into low-molecular compounds by undergoing chemical reactions, thereby being usable in the recycling industry in which recycled materials are prepared using physical and chemical recycling processes. Nevertheless, most of these polymeric materials, typically discharged after consumption, are contaminated with a variety of foreign substances. Waste fibers having a form in which various types of fibers with different physical properties are mixed are discharged in many cases. Accordingly, contamination resulting from foreign substances and complex recycling characteristics of raw materials provided in non-uniform ratios resulting from various unspecified materials are pointed out as the biggest problems in technology for recycling and adding high value to the polymeric materials.

The colored polymer products containing ester functional groups can be monomerized through depolymerization, so various chemical reaction pathways have been developed. Monomers produced through degradation can theoretically have properties the same as those of raw materials added to initial polymer synthesis. Depolymerization pathways applied to industrial recycling of PET include hydrolysis, glycolysis, methanolysis, ammonolysis, and the like, which are combined so that various chemical depolymerization methods can be applied, including complex processes that leverage the advantages of each process.

On the other hand, as such colored polymers containing ester functional groups described above, materials having a form into which color-expressing foreign substances such as dyes or pigments are introduced, are widely used. In many cases, pigments are used in a powder particle form dispersed in a solvent to be applied to polymers by painting or printing methods. Dyes, on the other hand, are used in a form capable of dissolving uniformly in a solvent to dye fabrics, leather, and the like by coloring methods. Dyes are further classified into natural dyes obtained from plants, animals, or minerals and artificial dyes synthesized artificially. Examples of artificial dyes may include direct dyes, mordant dyes, reducing dyes, color dyes, disperse dyes, and reactive dyes. As for dyes mainly applied to colored polymeric materials containing ester functional groups, azo-based and anthraquinone-based disperse dyes that can be classified depending on chemical structures are the most representative.

Most color-expressing foreign substances in such colored polymers containing ester functional groups described above are prepared so as not to be easily separable in daily environments or under usage conditions to prevent discoloration during use or cleaning processes. In particular, dyes are mainly used to express the colors of polyesters through coloring processes, and dye molecules in colored fabrics are present in the form of a complex with a polymer matrix. Thus, dyes are unlikely to be easily separated or removed by simply making contact with water or organic solvents.

Colored polyesters, which contain a large amount of impurities that are difficult to be removed as described above, are economically infeasible because the use and quality of recycled materials commercialized by physical and chemical recycling are subject to certain constraints, or purification processes to add high value to products are burdensome. Therefore, colored waste polyester, one of the polymers highly underutilized in the field of regeneration or recycling, is mostly discarded or incinerated, and thus is known as a waste resource that causes environmental problems.

Therefore, there is a need to develop significantly effective and economically feasible separation technologies in removing color-expressing foreign substances from colored polymers containing ester functional groups. To this end, there is a need to develop a technology for enabling polymers containing ester functional groups to be efficiently and economically separated from discharged waste polymer mixtures. In addition, the design of low-priced materials capable of effectively removing color-expressing foreign substances by simply making direct contact with colored polymers containing ester functional groups, as well as the identification of optimal conditions for processes using such design, is required.

In addition, there may be a part or trace of impurities remaining in the polymer prepared through the process described above. Furthermore, in many cases, a process of adding high value through physical or chemical regeneration may demand the quality of the final product obtained through an additional purification process that is easy and economical to be equal or not inferior to those of raw materials before synthesizing polymeric materials.

Therefore, a material used to remove color-expressing foreign substances from colored polymers containing ester functional groups is required to be low-priced, has low toxicity, and does not provide economically infeasible elements regarding the regeneration process that may be sequentially performed.

Existing technologies for removing color-expressing foreign substances from colored polymers containing ester functional include adsorption methods using strong adsorbents such as activated carbon, physical separation methods such as filtration or distillation, chemical methods such as oxidation, reduction, hydrolysis, and electrolysis. These methods may be performed in parallel with the chemical depolymerization or as a post-treatment process. U.S. Patent Publication Nos. 2015-0059103 A1 and 2009-0133200 A1 disclose technologies for removing dyes by directly applying p-xylene, an aromatic compound, as an extractant to colored polymers containing ester functional groups. In addition, Japanese Patent Publication No. 6659919 B2 discloses a technology for removing dyes by bringing an extractant into contact with polyester, the extractant containing 90% by mass or more of glycol monoester having 8 to 15 carbon atoms. However, due to the reversible dyeing properties of the dye, the bleaching effect is fragmentary in many cases. In addition, solvents themselves used during the processes of separating dyes are often harmful to the human body, expensive, and economically infeasible due to the excessively high application temperature, making the production of eco-friendly products difficult.

To solve the problems mentioned above, there is a need to develop an extraction solvent or a bleaching process using the same, the extraction solvent capable of effectively removing color-expressing foreign substances, such as dyes, from colored polymers containing ester functional groups.

On the other hand, existing classification methods used to select polymers include physical separation methods based on the difference in density of the polymers for classification, spectroscopic classification methods based on the diffusion and reflection spectra of light absorption depending on polymer structures, and chemical classification methods based on polymer degradation, such as oxidation, reduction, hydrolysis, electrolysis, and the like.

As an existing technology, a method for separating fibers using a difference in density between polyester and cotton was used in International Publication Patent No. 2013-182801. In addition, Chinese Patent Application No. 201510133888 and Autex Research Journal, 19 (2), 201-209 (2019) propose a method for identifying fibers using different diffuse reflection spectra of light depending on fiber structures. However, such existing methods have limitations in materials separable from polymer mixtures, and additional facilities and processes are required to improve the accuracy of the polymer identification method, so there is room for much improvement in terms of efficiency and cost.

DISCLOSURE

Technical Problem

The present disclosure aims to provide an extractant for removing color-expressing foreign substances from a colored polymer containing an ester functional group, which enables the mutual attraction between the colored polymer containing the ester functional group and the color-expressing foreign substances dyeing the same to be lowered, thereby inducing the color-expressing foreign substances to be separated from a polymer matrix, and the affinity between the separated foreign substances and an added solvent to be maintained, thereby inhibiting or minimizing re-dyeing of the polymer.

In addition, the present disclosure aims to provide a method for removing color-expressing foreign substances from a colored polymer containing an ester functional group, in which the extractant described above is heated to a temperature of 100° C. to 200° C. and then brought into direct contact with the colored polymer containing the ester functional group while applying a method such as one-time simple extraction, repeated extraction, or continuous extraction to separate the color-expressing foreign substances.

In addition, the present disclosure aims to provide a method for sufficiently removing color-expressing foreign substances from a colored polymer containing an ester functional group by heating an extraction mixed solution containing the extracted color-expressing foreign substances and then resupplying a vaporized extractant on the basis of continuous reflux to induce a predetermined volume of the extractant to be in continuous contact with the colored polymer containing the ester functional group.

In addition, the present disclosure aims to provide a method for removing residues of color-expressing foreign substances from a reaction product after applying a colored polymer containing the ester functional group free of the color-expressing foreign substances, obtained by the method described above, and an extractant absorbed thereinto to chemical depolymerization.

In addition, the present disclosure is characterized by not being involved in chemical depolymerization during a recycling process of the colored polymer containing the ester functional group. Furthermore, the present disclosure aims to provide an extractant for removing color-expressing foreign substances from the colored polymer containing the ester functional group, the extractant forming an unstable liquid-liquid phase with a hydrophilic solvent, a depolymerization reactant.

In addition, the present disclosure aims to provide a method for effectively selecting a polymer containing an ester functional group from a polymer mixture by selectively bleaching only a colored polymer containing an ester functional group from the colored polymer mixture in which the colored polymer containing the ester functional group and other types of colored polymers are mixed and then selecting the polymer free of color-expressing foreign substances through color differentiation.

Technical Solution

In solving the above problems, the present disclosure provides an extractant for removing color-expressing foreign substances from a colored polymer containing an ester functional group, which is characterized by including one or more compounds represented by Formula 1 or 2.

[Formula 1]

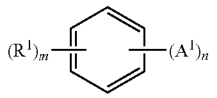

-continued

[Formula 2]

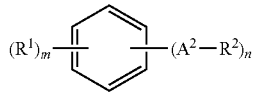

In Formula 1, $A^1$ is selected from among a carboxy group, an aldehyde group, and a nitrile group, $R^1$ is any one selected from among hydrogen, a hydroxy group, an ether group, an aldehyde group, a carboxy group, an alkyl group having 1 to 6 carbon atoms, a cycloalkyl group having 4 to 6 carbon atom, and an aryl group having 6 to 12 carbon atoms, the m is any one integer selected from 0 to 5, where when m is 2 or greater, each $R^1$ may be the same or different, and n is any one integer selected from 1 to 6, where when n is 2 or greater, each $A^1$ may be the same or different.

In addition, in Formula 2, $A^2$ may be at least one selected from among an ester group, an ether group, and a carbonyl group, and $R^2$ is an alkyl group having 1 to 10 carbon atoms, n is any one integer selected from 1 to 6, where when n is 2 or greater, $A^2$ and $R^2$ may be each independently the same or different, and other definitions of $R^1$ and m are the same as those in Formula 1 above.

In addition, in one embodiment of the present disclosure, the compound represented by Formula 1 or 2 is characterized by including one or more selected from the group consisting of methoxybenzene, 1,2-dimethoxybenzene, 1,3-dimethoxybenzene, 1,4-dimethoxybenzene, 1,2,3-trimethoxybenzene, 1,2,4-trimethoxybenzene, 1,3,5-trimethoxybenzene, 1,2,3,4-tetramethoxybenzene, 1,2,3,5-tetramethoxybenzene, 1,2,4,5-tetramethoxybenzena 2-methoxyphenol, 1,3-dimethoxy-2-hydroxybenzene, 4-hydroxy-3,5-dimethoxybenzoic acid, 3-(4-hydroxy-3,5-dimethoxyphenyl) prop-2-enal, 4-hydroxy-3,5-dimethoxybenzaldehyde, 4-hydroxy-3,5-dimethoxyacetophenone, 3-(4-hydroxy-3,5-dimethoxyphenylprop-2-enoic acid, 4-enyl-2,6-dimethoxyphenol, 4-hydroxy-3-methoxybenzaldehyde, 3-hydroxy-4-methoxybenzaldehyde, 2-hydroxy-3-methoxybenzaldehyde, 2-hydroxy-5-methoxybenzaldehyde, 2-hydroxy-4-methoxybenzaldehyde, 3,4-dihydroxybenzaldehyde, 1-methoxy-4-[(E)-prop-1-enyl]benzene, 2-tert-butyl-4-methoxyphenol, ethoxybenzene, 4-(prop-2-en-1-yl) phenol, 1-methoxy-4 (prop-2-en-1-yl) benzene, 5-(prop-2-en-1-yl)-2H-1,3-benzodioxol, 4-methoxy-2-[(E)-prop-1-yl] phenol, 2-methoxy-4-(prop-1-en-yl) phenol, methyl benzoate, 2-methoxybenzoic acid, 3-methoxybenzoic acid, 4-methoxybenzoic acid, ethyl 2-methoxybenzoic acid, ethyl 3-methoxybenzoic acid, 4-hydroxybenzoic acid, 3,4-dihydroxybenzoic acid, salicylic acid, vanillic acid, methyl benzoate, ethyl benzoate, propyl benzoate, butyl benzoate, benzyl benzoate, phenethyl benzoate, 4-acetylbenzonitrile, acetophenone, methoxyacetophenone, propiophenone, butyrophenone, benzaldehyde, 4-methylbenzaldehyde, hydroxybenzaldehyde, 3,4-dihydroxybenzaldehyde, anisaldehyde, 2-methoxyanisaldehyde, 3-methoxyanisaldehyde, benzonitrile, hydroxybenzonitrile, 3,4-dihydroxybenzonitrile, p-tolunitrile, methoxybenzonitrile, and the like.

In addition, as one embodiment of the extractant, the colored polymer containing the ester functional group shows a color on the basis of one or more color-expressing foreign substances. The extractant is characterized by not modifying a basic form of the polymer while selectively separating only the color-expressing foreign substances.

In addition, as one embodiment of the extractant, the colored polymer containing the ester functional group may be a colored polymer containing an ester functional group alone; or a combination thereof further containing one or more among polyethylene, polypropylene, polystyrene, polyvinyl chloride, cotton, linen, wool, rayon, acetate, acryl, nylon, and spandex.

In addition, as another embodiment of the present disclosure, a method for removing color-expressing foreign substances from a colored polymer containing an ester functional group is characterized by heating the extractant to a temperature of 70° C. to 200° C. to be brought into direct contact with the colored polymer containing the ester functional group, thereby eluting the color-expressing foreign substances from the colored polymer containing the ester functional group.

In addition, a further embodiment of the present disclosure, the method for removing the color-expressing foreign substances from the colored polymer containing the ester functional group is characterized in that in the eluting of the color-expressing substances from the colored polymer containing the ester functional group using the extractant, an extraction mixed solution containing the extractant and the extracted color-expressing foreign substances is heated, and the resulting vaporized extractant is continuously refluxed and resupplied so that the refluxed liquid-phased extractant is allowed to keep being in continuous contact with the colored polymer containing the ester functional group.

In addition, as a further embodiment of the present disclosure, the method for removing the color-expressing foreign substances from the colored polymer containing the ester functional group is characterized in that the extractant is brought into contact with the colored polymer containing the ester functional group at a temperature lower than the boiling point of the extractant by a value of about 0° C. to 50° C.

In addition, as a further embodiment of the present disclosure, the method for removing the color-expressing foreign substances from the colored polymer containing the ester functional group is characterized by in that after eluting the color-expressing foreign substances from the colored polymer containing the ester functional group by bringing the extractant into direct contact with the colored polymer containing the ester functional group, the extractant is recovered from an extraction mixed solution containing the extractant and the extracted color-expressing foreign substances by a method including one or more among evaporation and distillation.

In addition, as another embodiment of the present disclosure, the method for removing the color-expressing foreign substances from the colored polymer containing the ester functional group is characterized in that after bringing the extractant into direct contact with the colored polymer containing the ester functional group to elute the color-expressing foreign substances from the colored polymer containing the ester functional group, the bleached polymer containing the ester functional group is subjected to chemical depolymerization without involving an additional process of separating the extractant.

In addition, as a further embodiment of the present disclosure, the method for removing the color-expressing foreign substances from the colored polymer containing the ester functional group is characterized in that after depolymerizing the bleached polymer containing the ester functional group, residues of the color-expressing foreign substances present in the resulting product according to the depolymerization are separated through a liquid-liquid extraction process.

In addition, as a further embodiment of the present disclosure, the extractant may be added before or after the depolymerization in the method for removing the color-expressing foreign substances from the colored polymer containing the ester functional group. When adding the extractant before the depolymerization, the total amount of the extractant, including the added extractant, is characterized by satisfying a ratio of 0.1 to 50 moles per mole of a repeating unit of the polymer.

In addition, as a further embodiment of the present disclosure, the method for removing the color-expressing foreign substances from the colored polymer containing the ester functional group is characterized in that the liquid-liquid extraction process is performed in a temperature range of 25° C. to 150° C.

On the other hand, the present disclosure provides a method for selecting a polymer containing an ester functional group from a colored polymer mixture in which a colored polymer containing an ester functional group and other types of colored polymers are mixed, the method characterized by including: (a) bleaching color-expressing foreign substances selectively from only a colored polymer containing an ester functional group by bringing a colored polymer mixture in which the colored polymer containing an ester functional group and other types of colored polymers are mixed into contact with an extractant including one or more compounds represented by Formula 1 or 2; (b) analyzing colors of the respective polymers in the resulting polymer mixture obtained from the (a) bleaching using a sensor and then converting the analyzed colors to HSV values; and (c) selecting a polymer containing an ester functional group from the colored polymer mixture on the basis of the converted HSV values.

In one embodiment of the present disclosure, in the (c) selecting, the selection of the ester polymer may be characterized by collecting only those satisfying both an S value of 40 or less and a V value of 70 or more among the HSV values and classifying the collected polymers as the polymer containing the ester functional group.

In one embodiment of the present disclosure, the colored polymer containing the ester functional group may be a colored polymer containing an ester functional group alone; or a combination thereof further containing one or more among polyethylene, polypropylene, polystyrene, polyvinyl chloride, cotton, linen, wool, rayon, acetate, acryl, nylon, and spandex.

In one embodiment of the present disclosure, the (a) bleaching may be repeatedly performed two or more times. In addition, the bleaching process in the (a) bleaching may be performed at a temperature of 70° C. to 200° C.

In one embodiment of the present disclosure, the bleaching process in the (a) bleaching may be performed on the basis of continuous reflux that allows an extractant solution to be heated and the resulting vaporized extractant to be condensed by cooling and then resupplied.

In one embodiment of the present disclosure, the used extractant is characterized in that the extractant is recovered from an extraction mixed solution containing the extractant and the color-expressing foreign substances by a method including one or more among evaporation and distillation.

In one embodiment of the present disclosure, the extractant may be characterized by having a melting point lower than an extraction temperature and thus being present in a liquid phase.

Advantageous Effects

When using an extractant according to the present disclosure to remove color-expressing foreign substances from a colored polymer containing an ester functional group, the mutual attraction between the extractant and the polymer is stronger than that between the color-expressing foreign substances and the polymer, so the color-expressing foreign substances can be much rapidly and effectively removed from the colored polymer containing the ester functional group by lowering or inhibiting the mutual attraction between the polymer and the color-expressing foreign substances coloring the same, compared to when using extractants reported by the related art.

In addition, the extractant, according to the present disclosure, can interfere with the strong interaction between the color-expressing foreign substances and the polymer, as described above, and thus can be used to control non-covalent mutual interaction, such as hydrogen bonding strength, the n-overlap between the color-expressing foreign substances and an aromatic ring of the polymer, and the like.

In addition, the extractant, according to the present disclosure, is characterized by not being involved in chemical depolymerization in a regeneration process of the polymer containing the ester functional group after a bleaching process using the extractant and thus can be directly applied to the depolymerization without involving an additional process of separating the extractant from the polymer after the bleaching process.

In addition, the extractant, according to the present disclosure, can induce liquid-liquid phase separation between a hydrophilic solvent, a depolymerization reactant, by lowering the temperature after the chemical depolymerization in the recycling process of the polymer containing the ester functional group after the bleaching process using the extractant. In addition, the extractant can easily separate the color-expressing foreign substances from a depolymerized product because a trace of the color-expressing foreign substances, which has failed to be extracted from the formed liquid-liquid phase equilibrium during the process of bringing the polymer and the extractant into direct contact, is concentrated in an organic phase, and the depolymerized product is concentrated in an aqueous solution layer.

In addition, the extractant, according to the present disclosure, does not cause serious physical and chemical modification of the polymer containing the ester functional group and thus can be used to prepare physically regenerated materials for expressing different colors.

In addition, when bleaching the color-expressing foreign substances from the colored polymer containing the ester functional group, the extractant, according to the present disclosure, can reduce energy usage because the bleaching can be rapidly performed at relatively low temperatures.

Furthermore, most of the extractant can be substantially recovered and reusable through an additional separation process.

In addition, the extract, according to the present disclosure, can implement an environmentally friendly and economically feasible purification process because a solvent that is less harmful to the human body is used as the extractant.

In addition, in the method for removing the color-expressing foreign substances using the extractant according to the present disclosure, a complicated process unit is not required. Furthermore, the extractant can be directly added as a raw material for depolymerization without involving a process of separating the extractant from the bleached colored polymer containing the ester functional group. Moreover, a chemical regeneration method capable of completely removing residues of the color-expressing foreign substances, which have failed to be extracted after the reaction, can be provided.

In addition, the bleached polymer or depolymerized product that can be obtained by the technology, according to the present disclosure, is not particularly limited in quality and usage even in reuse as a raw material for plastic or resin products through repolymerization and thus can implement a perfect chemical recycling technology.

In addition, in the present disclosure, the color-expressing foreign substances, introduced into the colored polymer containing the ester functional group, can be removed from a polymer mixture in which the colored polymer containing the ester functional group and other types of colored polymers are mixed. In addition, provided is a method for easily and simply classifying the polymer containing the ester functional group from the colored polymer mixture by comparing color HSV values of the polymer with or free of the color-expressing foreign substances.

BEST MODE

Figure 1:
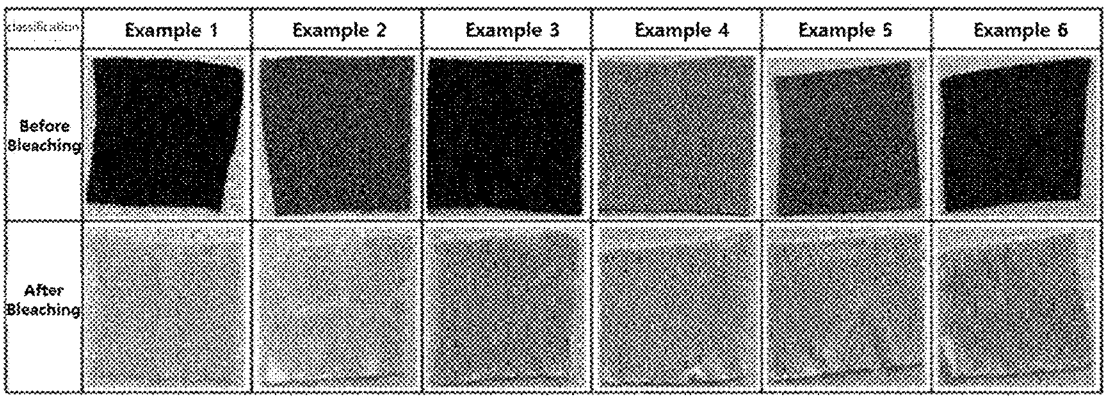
FIG. 1 shows images of waste polyester fabrics in different colors and those bleached by being in contact with anisole as an extractant, according to Examples 1 to 6 of the present disclosure.

Unless defined otherwise, all terms including technical and scientific terms used herein have the same meaning as commonly understood by those skilled in the art to which the present disclosure belongs. In general, the nomenclature used herein is well-known and commonly used in the art.

Unless the context clearly indicates otherwise, it will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Hereinafter, an extractant and a method for removing color-expressing foreign substances from a colored polymer containing an ester functional group and a method for chemically selecting a polymer containing an ester functional group from a colored polymer mixture, according to one embodiment of the present disclosure, are to be described in detail.

First, the extractant, according to one embodiment of the present disclosure, is an extractant used to remove the color-expressing foreign substances from the ester functional group, which is characterized by including one or more compounds represented by Formula 1 or 2 below.

[Formula 1]

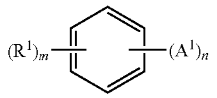

[Formula 2]

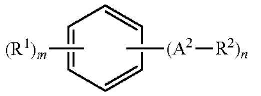

In Formula 1, $A^1$ is selected from among a carboxy group, an aldehyde group, and a nitrile group, $R^1$ is any one selected from among hydrogen, a hydroxy group, an ether group, an aldehyde group, a carboxy group, an alkyl group having 1 to 6 carbon atoms, a cycloalkyl group having 4 to 6 carbon atom, and an aryl group having 6 to 12 carbon atoms, the m is any one integer selected from 0 to 5, where when m is 2 or greater, each $R^1$ may be the same or different, and n is any one integer selected from 1 to 6, where when n is 2 or greater, each $A^1$ may be the same or different.

In addition, in Formula 2, $A^2$ may be at least one selected from among an ester group, an ether group, and a carbonyl group, $R^2$ is an alkyl group having 1 to 10 carbon atoms, n is any one integer selected from 1 to 6, where when n is 2 or greater, $A^2$ and $R^2$ may be each independently the same or different, and other definitions of $R^1$ and m are the same as those in Formula 1 above.

In one embodiment of the present disclosure, the compound represented by Formula 1 or 2 may include one or more selected from the group consisting of methoxybenzene, 1,2-dimethoxybenzene, 1,3-dimethoxybenzene, 1,4-dimethoxybenzene, 1,2,3-trimethoxybenzene, 1,2,4- trimethoxybenzene, 1,3,5-trimethoxybenzene, 1,2,3,4-tetramethoxybenzene, 1,2,3,5-tetramethoxybenzene, 1,2,4,5-tetramethoxybenzena 2-methoxyphenol, 1,3-dimethoxy-2-hydroxybenzene, 4-hydroxy-3,5-dimethoxybenzoic acid, 3-(4-hydroxy-3,5-dimethoxyphenyl) prop-2-enal, 4-hydroxy-3,5-dimethoxybenzaldehyde, 4-hydroxy-3,5-dimethoxyacetophenone, 3-(4-hydroxy-3,5-dimethoxyphenyl-prop-2-enoic acid, 4-enyl-2,6-dimethoxyphenol, 4-hydroxy-3-methoxybenzaldehyde, 3-hydroxy-4-methoxybenzaldehyde, 2-hydroxy-3-methoxybenzaldehyde, 2-hydroxy-5-methoxybenzaldehyde, 2-hydroxy-4-methoxybenzaldehyde, 3,4-dihydroxybenzaldehyde, 1-methoxy-4-[(E)-prop-1-enyl]benzene, 2-tert-butyl-4-methoxyphenol, ethoxybenzene, 4-(prop-2-en-1-yl) phenol, 1-methoxy-4 (prop-2-en-1-yl) benzene, 5-(prop-2-en-1-yl)-2H-1,3-benzodioxol, 4-methoxy-2-[(E)-prop-1-yl]phenol, 2-methoxy-4-(prop-1-en-yl) phenol, methyl benzoate, 2-methoxybenzoic acid, 3-methoxybenzoic acid, 4-methoxybenzoic acid, ethyl 2-methoxybenzoic acid, ethyl 3-methoxybenzoic acid, 4-hydroxybenzoic acid, 3,4-dihydroxybenzoic acid, salicylic acid, vanillic acid, methyl benzoate, ethyl benzoate, propyl benzoate, butyl benzoate, benzyl benzoate, phenethyl benzoate, 4-acetylbenzonitrile, acetophenone, methoxyacetophenone, propiophenone, butyrophenone, benzaldehyde, 4-methylbenzaldehyde, hydroxybenzaldehyde, 3,4-dihydroxybenzaldehyde, anisaldehyde, 2-methoxyanisaldehyde, 3-methoxyanisaldehyde, benzonitrile, hydroxybenzonitrile, 3,4-dihydroxybenzonitrile, p-tolunitrile, methoxybenzonitrile, and the like.

In addition, between the compounds represented by Formula 1 or 2, a compound whose boiling point is lower than an extraction temperature and thus is present in a liquid phase during extraction may be used as the extractant to remove the color-expressing foreign substances from the colored polymer containing the ester functional group. In addition, it is advantageous that the extractant has low viscosity and fluidity so that the color-expressing foreign substances may spread rapidly.

The extractant, according to the present disclosure, has a form in which at least one functional group is connected to an aromatic ring through a linker. The functional group is capable of causing hydrogen bonding or pi interaction (n-n interaction) with the polymer containing the ester functional group, which is useful as the extractant to remove the color-expressing foreign substances, such as pigments and dyes, from the polymer containing the ester functional group. Here, the polymer containing the ester functional group may have a form of a resin either alone or in combination, for example, a plastic material such as polyethylene, high-density polyethylene, low-density polyethylene, polypropylene, polystyrene, polyvinyl chloride, or the like, or a mixed form thereof further containing one or more among fabrics such as cotton, linen, wool, rayon, acetate, acryl, nylon, and spandex, for example, a blended fabric form of the colored polymer containing the ester functional group, further containing one more or among polyethylene, polypropylene, polystyrene, polyvinyl chloride, cotton, linen, wool, rayon, acetate, acryl, nylon and spandex. For reference, the listed examples of other polymers mixed with the polymer containing the ester functional group are disclosed only for illustrative purposes and are not limited to those listed above.

A method for removing color-expressing foreign substances from a colored polymer containing the ester functional group, according to another embodiment of the present disclosure, is characterized in that the extractant, according to the present disclosure, is heated to a temperature of 70° C. to 200° C. and brought into direct contact with the colored polymer containing the ester functional group to elute the color-expressing foreign substances. The elution process may be performed one time or repeatedly to extract the color-expressing foreign substances.

The extraction of the color-expressing foreign substances from the colored polymer containing the ester functional group may be performed at a temperature of 70° C. to 200° C., but more preferably at a temperature of 120° C. to 150° C. When the temperature is less than 70° C., the elution rate may be slow, thereby limiting the extraction effect. When the temperature exceeds 200° C., energy consumption may be excessively high.

In addition, according to one embodiment of the present disclosure, in separating the color-expressing foreign substances from the colored polymer containing the ester functional group using the extractant, a method for effectively removing the dyed color-expressing foreign substances can be applied by heating an extraction mixture containing the extractant and the extracted color-expressing foreign substances may be heated, and then continuously refluxing the resulting extractant to be resupplied so that the refluxed liquid-phase extractant is allowed to keep being in continuous contact with the colored polymer containing the ester functional group.

To reflux only the extractant from the extraction mixed solution containing the extractant and the color-expressing foreign substances, the temperature of a heating unit may be maintained close to the boiling point of the extractant. The temperature at which the polymer and the extractant are brought into contact (or extraction temperature) may be determined by the amount of heat applied to the heating unit and the reflux rate of the extractant, which may also affect extraction performance. Preferably, the extraction is performed such that the temperature at which the polymer and extractant are brought into contact is maintained or controlled to be lower than the boiling point of the extractant by a value of about 0° C. to 50° C.

On the other hand, a polymer resin containing the ester functional group, bleached after the extraction process described above, may have a form into which the extractant is absorbed. In addition, residues of the extractant may be separated by a method such as evaporation or drying to obtain a bleached polymer product. Furthermore, the extraction mixed solution, containing the color-expressing foreign substances, may be subjected to an additional evaporation or distillation process to recover most of the initially applied extractant.

After completion of the extraction process, when using the bleached polymer containing the ester functional group as a raw material for chemical depolymerization (for example, glycolysis), the depolymerization may be performed by adding the raw material having a form into which the extractant is absorbed to a chemical reactor without undergoing the separation process. It may be advantageous for the type or amount of extractant added not to directly participate in the depolymerization and not to adversely affect depolymerization performance while not forming thermodynamically unstable phases under the reaction conditions.

The present disclosure may provide a method for separating a trace of residues of color-expressing foreign substances, which have failed to be extracted, from a reaction product through a liquid-liquid extraction process after performing the chemical depolymerization on the bleached colored polymer containing the ester functional group.

In this case, a hydrophilic solvent including water may be additionally added to the reaction product to efficiently separate the color-expressing foreign substances and recover monomer products. In an organic phase layer where the extractant is present at a high concentration, the residues of the color-expressing foreign substances in the product are concentrated at a high concentration, and in an aqueous solution layer, most of the depolymerized product is distributed.

The extractant may be adjusted by adding the amount before and after the depolymerization. However, when added before the depolymerization, the total amount of the extractant, including the added extractant, may be adjusted such that a ratio of 0.1 to 50 moles per mole of a repeating unit of the polymer, preferably, the ratio of 1 to 5 moles per mole of the repeating unit, is satisfied. When adding the extractant in an amount corresponding to a ratio of less than 0.1 moles per mole of the repeating unit of the polymer, the boundary area of the liquid-liquid phase equilibrium is unclear after completion of the reaction, so the residues of the color-expressing foreign substances may be failed to be extracted to the organic phase. When adding the extractant in an amount corresponding to a ratio of more than 50 moles per mole of the repeating unit of the polymer, excessive dilution of the reactant may result in deterioration in depolymerization performance.

The liquid-liquid extraction process may be performed while maintaining the temperature to a range of 25° C. to 150° C., more preferably in the range of 50° C. to 100° C.

In addition, in the present disclosure, the liquid-liquid extraction process may be repeatedly performed by separating only the aqueous solution layer and then further adding the extractant to additionally remove dyes or the residues of the organic foreign substances from the depolymerized product prepared as described above.

In addition, methods, such as heating, drying, distillation, and evaporation, may be performed on the organic phase separated and discharged during the liquid-liquid extraction process to recover the extractant while separating and concentrating the color-expressing foreign substances, such as dyes.

In addition, a method for selecting only a polymer containing an ester functional group from a colored polymer mixture in which a colored polymer containing an ester functional group and other types of colored polymers are mixed, according to one embodiment of the present disclosure, is characterized by including (a) bleaching color-expressing foreign substances selectively from only a colored polymer containing an ester functional group by bringing a colored polymer mixture in which the colored polymer containing the ester functional group and other types of colored polymers are mixed into contact with an extractant including one or more compounds represented by Formula 1 or 2, (b) analyzing colors of the respective polymers in the resulting polymer mixture obtained from the (a) bleaching using a sensor and then converting the analyzed colors into HSV values, and (c) selecting a polymer containing an ester functional group from the colored polymer mixture on the basis of the converted HSV values.

The extractant in the (a) bleaching has a form in which at least one functional group is connected to an aromatic ring through a linker. In addition, the functional group is characterized by being capable of causing hydrogen bonding or pi interaction (π-π interaction) with the polymer containing the ester functional group.

In addition, the polymer containing the ester functional group may have a form of a resin either alone or in combination, for example, a plastic material such as polyethylene, high-density polyethylene, low-density polyethylene, polypropylene, polystyrene, polyvinyl chloride, or the like, or a mixed form thereof further containing one or more among polymers such as cotton, linen, wool, rayon, acetate, acryl, nylon, and spandex. In addition, the fabric may be a colored polymer fabric containing an ester functional group alone; or a blended fabric thereof further containing one or more among polyethylene, polypropylene, polystyrene, polyvinyl chloride, cotton, linen, wool, rayon, acetate, acryl, nylon, and spandex.

The (a) bleaching, a step where the extractant is brought into direct contact with the colored polymer containing the ester functional group to elute the color-expressing foreign substances such as dyes, may be repeatedly performed two or more times.

The (a) bleaching may be performed at a temperature of 70° C. to 200° C. but may be more preferably performed at a temperature of 120° C. to 150° C. When the temperature is less than 70° C., the elution rate may be slow, thereby limiting the extraction effect. When the temperature exceeds 200° C., energy consumption may be excessively high.

In the (a) bleaching, a method for increasing the effect of extracting the color-expressing foreign substances may be applied on the basis of a continuous reflux method in which extraction mixed solution, containing the extractant and the color-expressing foreign substances, is heated to evaporate only the extractant, and then the resulting extractant is condensed by cooling and resupplied so that the extractant and the polymer containing the ester functional group are allowed to keep being in continuous contact with each other.

In addition, to reflux only the extractant from the extraction mixed solution containing the extractant and the color-expressing foreign substances, the temperature of a heating unit may be maintained close to the boiling point of the extractant. The temperature at which the polymer and the extractant are brought into contact (or extraction temperature) may be determined by the amount of heat applied to the heating unit and the reflux rate of the extractant, which may also affect extraction performance. Preferably, the extraction is performed such that the temperature at which the polymer and extractant are brought into contact is maintained or controlled to be lower than the boiling point of the extractant by a value of about 0° C. to 50° C.

After eluting the color-expressing foreign substances, such as dyes, from the colored polymer containing the ester functional group using the extractant, the extractant may be recovered by a method including one or more among evaporation and distillation.

The (b) analyzing is a step of measuring the color of the colored polymer mixture treated with the extractant in the (a) bleaching and expressing the color as an HSV value.

In measuring the color of the polymer, equipment equipped with functions of processing image signals capable of converting the color of the polymer in the area where the polymer is located into color coordinate values as well as converting and storing the image signals into electronic signals may be used. For example, cameras for measuring colors, video readers, and other various imaging equipment for obtaining image signals may be used. In addition, equipment equipped with a charge-coupled device (CCD) detector capable of receiving color changes depending on the surface texture of printed materials, fabrics, and textiles may be useful. Furthermore, equipment including detectors such as a complementary metal-oxide semiconductor (CMOS), in which signals are processed in different manners depending on measurement conditions and detection resolution, may also be used.

When measuring the color using the camera, it may be appropriate to use lighting equipment together to prevent the color from changing depending on the amount of light. In such lighting equipment, discharge lights, halogen lights, strobe lights, optical light-emitting diodes, and the like may be used as light sources.

The color of the polymer image taken with the camera may be handled in selection as color information based on RGB color coordinates. However, to clearly distinguish the bleaching degree of the colored polymer mixture, it may be useful to include coordinates that characterize the lightness. Thus, the color is preferably converted from RGB color coordinate values to HSV color coordinate values capable of expressing characteristics of lightness.

In addition, when converting RGB data to another color space to analyze the color, various color systems presented by the International Commission on Illumination (CIE) may be used. In addition, there is CIELAB color coordinate as another example other than HSV.

The (c) selecting is a step of selecting the polymer containing the ester functional group from the colored polymer mixture depending on the HSV value obtained in the (b) analyzing. In this case, the selection may be performed by collecting those satisfying both an S value of 40 or less and a V value of 70 or more among the HSV values and classifying the collected polymer as the polymer containing the ester functional group. The selection of those satisfying both the S value of 40 or less and the V value of 70 or more among the HSV values may be performed by an existing means, so the detailed description thereof is omitted.

Hereinafter, detailed processes of the present disclosure will be described with reference to examples and comparative examples. These are representative examples related to the present disclosure and should not be construed as limiting the scope of the present disclosure.

Colored Waste Polymer Raw Materials Containing Ester Functional Groups

Raw Material 1

A navy blue waste polyester fabric was cut to prepare a colored waste polymer raw material having a square size of about 3 cm on each side.

Raw Material 2

A red waste polyester fabric was cut to prepare a colored waste polymer raw material having a square size of about 3 cm on each side.

Raw Material 3

A black waste polyester fabric was cut to prepare a colored waste polymer raw material having a square size of about 3 cm on each side.

Raw Material 4

A purple waste polyester fabric was cut to prepare a colored waste polymer raw material having a square size of about 3 cm on each side.

Raw Material 5

A green waste polyester fabric was cut to prepare a colored waste polymer raw material having a square size of about 3 cm on each side.

Raw Material 6

A brown waste polyester fabric was cut to prepare a colored waste polymer raw material having a square size of about 3 cm on each side.

Polymer Raw Materials Containing Ester Functional Group

Raw Material 7

An undyed plain polyester fabric was cut into a square having a size of about 3 cm on each side to prepare a colorless polymer raw material for comparing bleaching effects.

Raw Material 8

A plain polyester fabric (dye weight ratio: 1.5% o.w.f) dyed using a navy blue disperse dye (Dystar Dianix Blue E-R 150%; C.I. Disperse Blue 56) was cut to prepare a colored polymer raw material having a square size of about 3 cm on each side.

Raw Material 9

A plain polyester fabric (dye weight ratio: 1.5% o.w.f) dyed using a red azo-based disperse dye (C.I. Disperse Red 1) was cut to prepare a colored polymer raw material having a square size of about 3 cm on each side.

Raw Material 10

A plain polyester fabric (dye weight ratio: 1.5% o.w.f) dyed using a red anthraquinone-based disperse dye (C. I. Disperse Red 9) was cut to prepare a colored polymer raw material having a square size of about 3 cm on each side.

Raw Material 11

A blended polyester-based fabric (dye weight ratio: 1.5% o.w.f) obtained by dyeing and treating a fabric in which 82% polyester and 18% spandex were blended using a black disperse dye (Dystar Dianix Deep Black Plus) was cut to prepare a colored polymer raw material having a square size of about 3 cm on each side.

Polymer Raw Materials Other than Polymers Containing Ester Functional Groups

Raw Material 12

An undyed plain nylon fabric was cut into a square having a size of about 3 cm on each side to prepare a colorless polymer raw material for comparing bleaching effects.

Raw Material 13

A plain silk fabric (dye weight ratio: 1.5% o.w.f) dyed using an orange acid dye (Dystar Telon Orange AGT 01; C.I.

Acid Orange 116) was cut to prepare a colored polymer raw material having a square size of about 3 cm on each side.

Raw Material 14

An undyed plain wool fabric was cut into a square having a size of about 3 cm on each side to prepare a colorless polymer raw material for comparing bleaching effects.

Raw Material 15

A plain wool fabric (dye weight ratio: 1.5% o.w.f) dyed using an orange acid dye (Dystar Telon Orange AGT 01; C.I. Acid Orange 116) was cut to prepare a colored polymer raw material having a square size of about 3 cm on each side.

Raw Material 16

An undyed plain silk fabric was cut into a square having a size of about 3 cm on each side to prepare a colorless polymer raw material for comparing bleaching effects.

Raw Material 17

A plain silk fabric (dye weight ratio: 1.5% o.w.f) dyed using an orange acid dye (Dystar Telon Orange AGT 01; C.I. Acid Orange 116) was cut to prepare a colored polymer raw material having a square size of about 3 cm on each side.

Raw Material 18

An undyed plain acrylic fabric was cut into a square having a size of about 3 cm on each side to prepare a colorless polymer raw material for comparing bleaching effects.

Raw Material 19

A plain acrylic fabric (dye weight ratio: 1.5% o.w.f) dyed using a yellow basic dye (Dystar-Astrazon Golden Yellow GL-E 200%, C.I. Basic Yellow 28) was cut to prepare a colored polymer raw material having a square size of about 3 cm on each side.

Raw Material 20

An undyed plain cotton fabric was cut into a square having a size of about 3 cm on each side to prepare a colorless polymer raw material for comparing bleaching effects.

Raw Material 21

A plain cotton fabric (dye weight ratio: 2.0% o.w.f) dyed using a yellow reactive dye (Remazol Golden Yellow RNL, C.I. Reactive Orange 107) was cut to prepare a colored polymer raw material having a square size of about 3 cm on each side.

Raw Material 22

An undyed plain rayon fabric was cut into a square having a size of about 3 cm on each side to prepare a colorless polymer raw material for comparing bleaching effects.

Raw Material 23

A plain rayon fabric (dye weight ratio: 2.0% o.w.f) dyed using a yellow reactive dye (Remazol Golden Yellow RNL, C.I. Reactive Orange 107) was cut to prepare a colored polymer raw material having a square size of about 3 cm on each side.

Waste Clothing Raw Materials Made of Polymer Containing Ester Functional Group

Raw Material 24

A dark navy blue fleece jacket made of 100% polyester that had been discarded after consumption was washed two times using a surfactant. Then, excessive amounts of ethanol and distilled water were each independently used for washing. The washed waste clothing was dried until no residues of moisture remained and then cut into pieces having a size of 1 cm or smaller on each side to prepare a waste clothing raw material.

Comparison of Bleaching Effects Depending on Raw Material Color, Extractant Type, and Extraction Temperature Example 1

About 1.0 g of the navy blue waste polyester fabric of Raw Material 1 was added to a 250-ml flask containing 100.0 g of anisole (methoxybenzene) heated to and maintained at a temperature of 150° C. in advance and stirred at 300 rpm for 10 minutes using a magnetic stirrer. Next, the polyester fiber fabric was taken out using a tweezer, washed by being dipped using 10.0 g of anisole at the same temperature prepared in a 50-ml vial bottle for about 1 to 2 seconds, transferred to a glass evaporation dish, and then dried in a vacuum dryer maintained at 60° C. under vacuum (≤2 mmHg) for 12 hours or more to prepare a bleached fabric.

L*, a*, and b* color coordinate values of the bleached fabric were measured using a spectrophotometer (manufacturer: Konica Minolta, model name: CM-3600A). The values represented by L*, a*, and b* are coordinate values of the color space standardized by the International Commission on Illumination (CIE), where L* is represented by a numerical value from 0 (black) to 100 (white) that expresses lightness, and a* and b* are represented by numerical values along the complementary color axes of red (+)/green (−) and yellow (+)/blue (−), respectively.

Example 2

The raw material was treated in the same manner as in Example 1, except for using the red waste polyester fabric of Raw Material 2 as the colored waste polymer raw material.

Example 3

The raw material was treated in the same manner as in Example 1, except for using the black waste polyester fabric of Raw Material 3 as the colored waste polymer raw material.

Example 4

The raw material was treated in the same manner as in Example 1, except for using the purple waste polyester fabric of Raw Material 4 as the colored waste polymer raw material.

Example 5

The raw material was treated in the same manner as in Example 1, except for using the green waste polyester fabric of Raw Material 5 as the colored waste polymer raw material.

Example 6

The raw material was treated in the same manner as in Example 1, except for using the brown waste polyester fabric of Raw Material 6 as the colored waste polymer raw material.

Comparative Example 1

The raw material was treated in the same manner as in Example 1, except for performing the extraction and washing processes by maintaining the temperature of the anisole, an extractant, at 50° C.

Example 7

The raw material was treated in the same manner as in Example 1, except for performing the extraction and washing processes by maintaining the temperature of the anisole, an extractant, at 70° C.

Example 8

The raw material was treated in the same manner as in Example 1, except for performing the extraction and washing processes by maintaining the temperature of the anisole, an extractant, at 90° C.

Example 9

The raw material was treated in the same manner as in Example 1, except for performing the extraction and washing processes by maintaining the temperature of the anisole, an extractant, at 110° C.

Example 10

The raw material was treated in the same manner as in Example 1, except for performing the extraction and washing processes by maintaining the temperature of the anisole, an extractant, at 130° C.

Comparative Example 2

The raw material was treated in the same manner as in Comparative Example 1, except for using the red waste polyester fabric of Raw Material 2 as the colored waste polymer raw material.

Example 11

The raw material was treated in the same manner as in Example 7, except for using the red waste polyester fabric of Raw Material 2 as the colored waste polymer raw material.

Example 12

The raw material was treated in the same manner as in Example 8, except for using the red waste polyester fabric of Raw Material 2 as the colored waste polymer raw material.

Example 13

The raw material was treated in the same manner as in Example 9, except for using the red waste polyester fabric of Raw Material 2 as the colored waste polymer raw material.

Example 14

The raw material was treated in the same manner as in Example 10, except for using the red waste polyester fabric of Raw Material 2 as the colored waste polymer raw material.

Comparative Example 3

The raw material was treated in the same manner as in Example 10, except for using p-xylene as the extractant.

Comparative Example 4

The raw material was treated in the same manner as in Example 10, except for using methoxycyclohexane as the extractant.

Example 15

The raw material was treated in the same manner as in Example 10, except for using 1,2-dimethoxybenzene as the extractant.

Example 16

The raw material was treated in the same manner as in Example 10, except for using 1,4-dimethoxybenzene as the extractant.

Example 17

The raw material was treated in the same manner as in Example 10, except for using ethoxybenzene as the extractant.

Example 18

The raw material was treated in the same manner as in Example 10, except for using guaiacol as the extractant.

Comparison of Bleaching Effects Depending on Raw Material Color

Examples 1 to 6 were performed to compare bleaching effects depending on the color of each colored polymer containing an ester functional group. FIG. 1 shows images of the fibers after bringing the waste polyester fabrics of Raw Materials 1 to 6 in different colors into contact with the anisole, heated to 150° C., for 10 minutes as in the extraction condition shown in Example 1, to remove the dyes and then undergoing the bleaching process for comparison.

As shown in FIG. 1, it is confirmed that all the waste polyester fabrics bleached by being brought into contact with the anisole turn bright white regardless of the initial colors and the lightness values and are bleached to indistinguishable levels.

Table 1 shows L*, a*, and b* values measured with a spectrophotometer to compare the colors of the waste polyester fabrics bleached by being brought into contact with the anisole in Examples 1 to 6 and values obtained by converting the L*, a*, and b* values to HSV color space.

TABLE 1

| Classification | Raw material | Original color | Classification | L* | a* | b* | H | S | V |
|---|---|---|---|---|---|---|---|---|---|
| Example 1 | Raw Material 1 | Navy blue | Before bleaching | 19.1 | 1.6 | −9.5 | 224.2 | 31.7 | 23.5 |
| | | | After bleaching | 82.6 | 0.7 | 0.8 | 20 | 1.7 | 81.4 |
| Example 2 | Raw Material 2 | Red | Before bleaching | 41.9 | 53.9 | 18.2 | 349.5 | 73 | 70.9 |
| | | | After bleaching | 82.7 | 0.2 | 1 | 30 | 1.5 | 81.2 |
| Example 3 | Raw Material 3 | Black | Before bleaching | 19 | 0.8 | −0.9 | 270 | 3.4 | 18.6 |
| | | | After bleaching | 83.4 | −0.2 | 2.3 | 40 | 2.8 | 82.1 |
| Example 4 | Raw Material 4 | Purple | Before bleaching | 66.9 | 7 | −14.6 | 246.2 | 15.4 | 74.1 |
| | | | After bleaching | 83.6 | −0.1 | −0.4 | 210 | 0.6 | 82 |
| Example 5 | Raw Material 5 | Green | Before bleaching | 53.6 | −42.8 | 18.1 | 153.2 | 77.2 | 57.1 |
| | | | After bleaching | 84.4 | −1.5 | 1.5 | 105 | 1.7 | 82.9 |

As shown in Table 1, the lightness value L* measured with the spectrophotometer for each waste polyester fabric, bleached according to Examples 1 to 6, showed an extremely high value of 82 to 85. The reason that the measured lightness values fail to reach 100 is due to the fabric properties of the fibers and the unique characteristics in the measurement environment resulting from the use of a dark surface as the background for the fiber measurement. The a* and b* values among the color coordinates, expressing differences in saturation between red/green and yellow/blue, were measured to significantly vary depending on the original colors of the waste fabrics. However, it was confirmed that these values were much closer to 0 after being bleached.

As shown in Table 1 above, it was confirmed that when removing the color-expressing foreign substances from the colored polymers containing the ester functional groups using the extractant presented in the present disclosure, separation was effectively performed regardless of the colors. In addition, it is seen that excellent bleaching effects are obtainable even when brought into contact for an extremely short amount of time (10 minutes).

In addition, as shown in Table 1 above, the fact that the extractant presented in the present disclosure functions effectively on the waste polyester fabrics well demonstrates that the extractant is applicable to recycling processes of actual waste polymers containing ester functional groups.

Comparison of Bleaching Effects Depending on Extractant Temperature

Examples 1, 2, and 7 to 14 and Comparative Examples 1 to 2 were performed to compare bleaching effects on each colored polymer containing the ester functional group depending on the extractant temperatures. The colored waste polymer raw materials containing the ester functional groups were bleached by being brought into contact with the extractant (anisole) maintained at varying temperatures for the same amount of time (10 minutes). In addition, the navy blue waste polyester fabric of Raw Material 1 and the red waste polyester fabric of Raw Material 2 were used as raw materials for bleaching.

Figure 2:
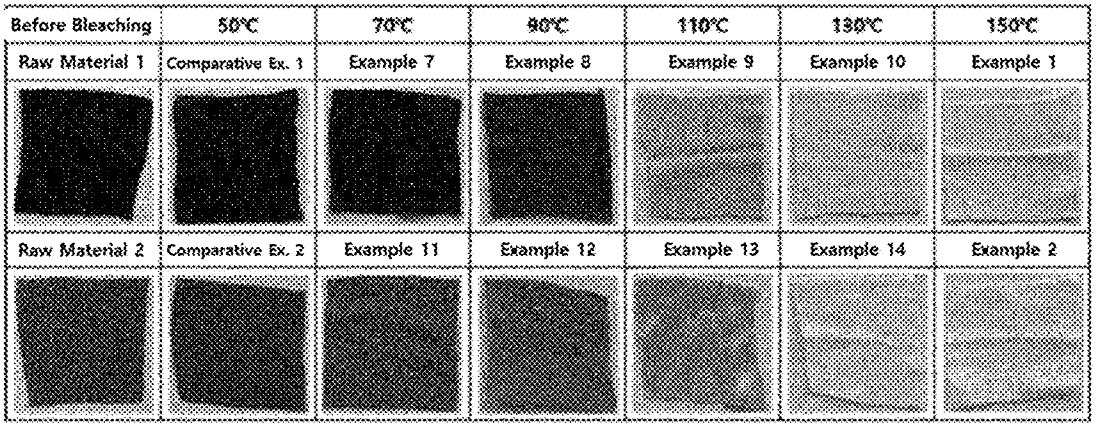
FIG. 2 shows bleaching effects on waste polyester fabrics depending on extractant temperatures, according to Examples 1, 2, and 7 to 14 and Comparative Examples 1 to 2 of the present disclosure.

FIG. 2 shows images of the fabrics bleached using the extractant, maintained at varying temperatures in Examples 1, 2, and 7 to 14 and Comparative Examples 1 to 2. Table 2 shows L*, a*, and b* values measured using a spectrophotometer for the navy blue waste polyester fabric of Raw Material 1 and the red waste polyester fabric of Raw Material 2, and for the respective fabrics undergone the bleaching process in Examples 1, 2, and 7 to 14 and Comparative Examples 1 to 2, values obtained by converting the measured L*, a*, and b* values to HSV color space, and values of dye removal rates calculated from the relative absorbance measured using an UV-Vis spectrophotometer.

As shown in FIG. 2, when bleaching progressed by being brought into contact with the extractant maintained at a temperature of 50° C. through Comparative Examples 1 and 2, the degree of bleaching was insignificant, so the color change was indistinguishable. In the case of Examples 7, 8, 11, and 12, where the extractant maintained at a temperature of 70° C. or higher was brought into contact, even though the color was observed to be faded, a low level of bleaching was still exhibited. In addition, in the case of Examples 9 and 13, where the extractant maintained at 110° C. was used, a relatively large amount of dyes was eluted, confirming that the bleaching progressed.

In particular, when applying the extractant temperature to 130° C. or higher through Examples 1, 2, 10, and 14, bleaching progressed to a level where the colors of the fabrics turn bright white after being brought into contact with the extractant, confirming that most of the color-expressing foreign substances were eluted.

TABLE 2

| Original color of fabric | Class-ification | Extraction temperature (° C.) | L* | a* | b* | H | S | V | Dye removal rate |
|---|---|---|---|---|---|---|---|---|---|
| Navy blue | Raw Material 1 | — | 19.1 | 1.6 | −9.5 | 224.2 | 31.7 | 23.5 | — |
| | Comparative Example 1 | 50 | 19.3 | 1.4 | −9.8 | 222.0 | 33.1 | 23.9 | 1.5 |
| | Example 7 | 70 | 20.0 | 1.4 | −11.6 | 220.8 | 38.1 | 25.5 | 6.4 |
| | Example 8 | 90 | 30.4 | −1.6 | −25.5 | 207.7 | 71.3 | 43.6 | 51.1 |
| | Example 9 | 110 | 70.5 | −5.5 | −11.3 | 202.3 | 22.2 | 75.5 | 97.5 |
| | Example 10 | 130 | 82.0 | 0.4 | 0.1 | 0.0 | 0.5 | 80.3 | 100.0 |
| | Example 1 | 150 | 82.6 | 0.7 | 0.8 | 20.0 | 1.7 | 81.4 | 100.0 |
| Red | Raw Material 2 | — | 41.9 | 53.9 | 18.2 | 349.5 | 73.0 | 70.9 | — |
| | Comparative Example 2 | 50 | 41.8 | 54.2 | 19.5 | 350.1 | 73.6 | 71.0 | 0.8 |
| | Example 11 | 70 | 43.5 | 55.9 | 19.6 | 349.6 | 73.5 | 73.8 | 5.6 |
| | Example 12 | 90 | 48.0 | 52.9 | 14.1 | 348.8 | 65.3 | 77.2 | 46.4 |
| | Example 13 | 110 | 77.0 | 10.8 | 0.6 | 346.7 | 13.0 | 82.7 | 96.8 |
| | Example 14 | 130 | 82.5 | 0.9 | 0.9 | 15.0 | 2.0 | 81.5 | 100.0 |
| | Example 2 | 150 | 82.7 | 0.2 | 1.0 | 30.0 | 1.5 | 81.2 | 100.0 |

As shown in Table 2 above, in the case of Comparative Examples 1 and 2, where the extractant maintained at a low temperature of 50° C. was brought into contact, there was almost no change in the L*, a*, and b* values of the fabrics before and after being in contact, so the bleaching effect was unable to be confirmed. In the case of Examples 7, 8, 11, and 12, where the extractant maintained at a temperature in a range of 70 to 100° C. was brought into contact, gradual changes in the L*, a*, and b* values were observed, indicating that the bleaching partially occurred.

In addition, in the case of Examples 1, 2, 10, and 14, where the extractant maintained at a temperature exceeding 100° C. was used, a tendency in which not only did the lightness value L* increase significantly regardless of the colors of the fabrics, but also did the a* and b* values, expressing differences in saturation, become close to 0 was clearly observed.

In Table 2 above, the dye removal rates depending on the extraction temperatures were calculated from the relative absorbance measured using the UV-Vis spectrophotometer. A portion of the extraction mixed solution containing the extractant and the extracted dye obtained after bleaching was taken and five-fold diluted using quantified anisole to prepare a sample for chromaticity measurement (dye concentration=$C_s$). Next, after being transferred to a 10-mm cuvette, the absorbance ($A_s$) for each sample was measured at each wavelength where maximum absorption occurred ($\lambda_{max}$; 600 nm for the extract of Raw Material 1 and 512 nm for the extract of Raw Material 2) using the UV-Vis spectrophotometer.

The maximum amount of dye extractable from each colored waste fabric was considered to be the amount of dye completely eluted from the colored waste fabric by repeatedly performing the bleaching process three times by bringing the same mass of the colored polymeric fabric into contact with the anisole maintained at 150° C.

To compare the extraction effects in examples performed at varying extraction temperatures, the extraction mixed solutions (including the extracted dyes) discharged by each extraction process were diluted by adding anisole in the same ratio. Then, the chromaticity was measured. The extraction mixtures from which the dyes were completely eluted at 150° C. were also diluted to contain the same mass of anisole as other samples, and this was used as the sample for chromaticity measurement with the maximum concentration (dye concentration=$C_\infty$). Then, the absorbance value ($A_\infty$) measured for the sample was used as an absolute standard to show the relative absorbance of the extraction mixed solution prepared from each example.

The dye removal rate (R) of the colored waste fabric bleached at the varying extraction temperatures described above may be calculated from the following equation using the absorbance values measured for each sample.

$$R\ (\%) = (C_\infty - C_s)/C_\infty \times 100 = (A_\infty - A_s)/A_\infty \times 100$$

As shown in Table 2 above, as a result of calculating the dye removal rates, it was found that the effect of removing the dye from the waste polymer raw material was clearly exhibited when maintaining the temperature at which the extractant was brought into contact at 70° C. or higher. It was found that the dominant extraction effect exhibited when using the extractant maintained at a temperature of 100° C. or higher. In addition, when using the extractant maintained at a temperature of 130° C. or higher, most of the dyes were able to be removed even when in contact for only a relatively short amount of time (10 minutes).

Comparison of Bleaching Effects Depending on Extractant Type

In Examples 10 and 15 to 18 and Comparative Examples 3 to 4, the same conditions were applied, except for the extractants used for the bleaching to compare bleaching effects depending on different extractants. The navy blue waste polyester fabric of Raw Material 1 was used as the colored waste polymer raw material, and the extractant temperature was maintained constant at 130° C.

Figure 3:
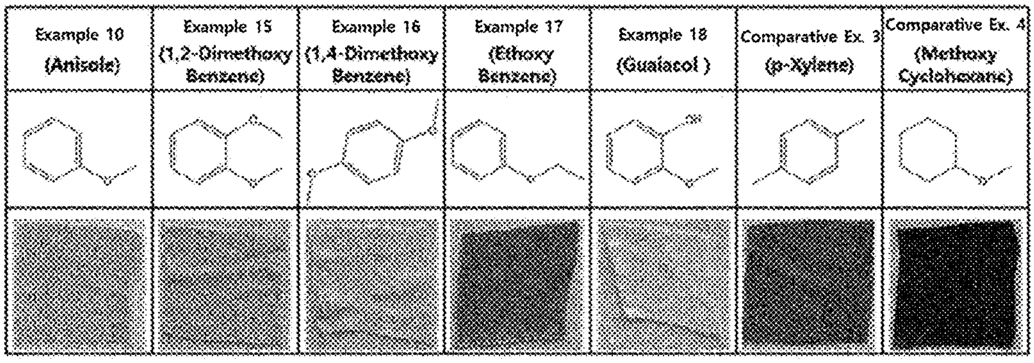
FIG. 3 shows images of chemical structures of compounds used and fabrics bleached using the compounds for comparison, comparing the bleaching effects of compounds represented by Formula 1 or 2 included in the present disclosure and other compounds, according to Examples 10 and 15 to 18 and Comparative Examples 3 to 4 of the present disclosure.

FIG. 3 shows images of the fabrics undergoing the bleaching process in Examples 10 and 15 to 18 and Comparative Examples 3 to 4, and Table 3 below shows L*, a*, and b* values obtained by measuring each color of the bleached waste polyester fabric and values obtained by converting the L*, a*, and b* values to HSV color space.

TABLE 3

| Classification | Types of extractant | L* | a* | b* | H | S | V |
|---|---|---|---|---|---|---|---|
| Raw Material 1 | — | 19.1 | 1.6 | −9.5 | 224.2 | 31.7 | 23.5 |
| Comparative Example 3 | p-Xylene | 54.5 | −7.1 | −21.0 | 218.2 | 32.9 | 65.2 |
| Example 10 | Anisole | 82.6 | 0.7 | 0.8 | 20.0 | 1.7 | 81.4 |
| Example 15 | 1, 2-Dimethoxybenzene | 77.6 | −1.7 | −2.9 | 201.8 | 5.7 | 77.2 |
| Example 16 | 1, 4-Dimethoxybenzene | 79.7 | 0.0 | −0.1 | 0.0 | 0.1 | 77.5 |
| Example 17 | Ethoxybenzene | 71.5 | −4.9 | −10.1 | 203.7 | 19.7 | 75.7 |
| Example 18 | Guaicol | 84.0 | 0.6 | 0.3 | 30.0 | 1.0 | 82.7 |
| Comparative Example 4 | Methoxycyclohexane | 30.0 | −2.0 | −24.5 | 207.6 | 70.4 | 42.5 |

In the case of Comparative Example 3, where p-xylene was used as the extractant, the lightness values L* were measured to be 55 or less, and the a* and b* values, expressing differences in saturation, were measured to be −7.1 and −21.0, respectively, indicating that a large amount of dyes still remained. In cases of using the compounds represented by the formula according to the present disclosure as the extractants as in Examples 10 and 15 to 18, all the lightness values L* were exhibited to be 70 or more, and the a* and b* values, expressing differences in saturation, were also measured to be close to neutral values, confirming the bleaching effects clearly existed.

Methoxycyclohexane has a structure similar to that of anisole, which is one of the compounds represented by the formula according to the present disclosure, but is a compound transformed into a saturated cycloalkane having the same number of carbon atoms rather than an aromatic ring, which is the main functional group of the compound. In the case of applying methoxycyclohexane to the same extraction conditions as those in Examples 10 and 15 to 18 and Comparative Examples 3 to 4 (Comparative Example 4), much poorer bleaching effects were exhibited than those in cases of applying the compounds represented by the formula, according to the present disclosure, to Examples 10 and 15 to 18, as shown in FIG. 3.

As shown in Table 3 above, when comparing the L*, a*, and b* values of the fabric bleached in Comparative Example 4 and Raw Material 1, a shift in coordinates occurred after the bleaching treatment in Comparative Example 4. However, when the bleaching progressed, no significant vertical rise of the L* value occurring in the color coordinate space or shift toward the neutral value of the a* and b* values was observed. Therefore, it is seen that the bleaching effect of the compound without the aromatic ring, serving as the main functional group of the compound, is extremely insignificant.

Method for Improving Bleaching Efficiency by Continuously Refluxing Extractant Typically, most color-expressing foreign substances added to colored polymers containing ester functional groups have high boiling points. Using these characteristics, only the extractant is enabled to be vaporized from the extraction mixed solution containing the extracted extractant and the dye after bleaching the colored polymer containing the ester functional group. When inducing the waste polymer raw material to be in intermittent or continuous re-contact by refluxing the vaporized extractant, extraction performance may be improved even when using a limited amount of solvent, which may be applied to continuous processes for bleaching a large amount of raw materials.

In Examples 19 to 22, the waste polymer raw materials containing the ester functional groups were bleached using the Soxhlet extraction method to confirm the bleaching effects in the continuous bleaching method based on the extractant reflux as described above. The temperature of a heating unit was maintained at a temperature of the boiling point of the extractant or higher so that only the extractant was refluxed from the extraction mixed solution containing the extracted dye and the extractant flushed during the bleaching process. In addition, the temperature inside the extractor was maintained at 125° C. to 135° C.

Example 19

About 6.0 g of the navy blue waste polyester fabric of Raw Material 1 was put into a cylinder-shaped filter paper (Whatman; pore size of 10 μm) to be placed in a Soxhlet extractor having a volume of 250 ml. Then, a 500-mL round-bottom flask filled with 250 g of anisole was connected to the bottom part of the extractor, and a condenser for refluxing the extractant was connected to the top part so that the raw material was allowed to keep being in continuous contact with the refluxed extractant. Extraction was performed for 1 hour from when the anisole in the flask reached the boiling point. In addition, bleaching was performed while maintaining the temperature in the Soxhlet extractor at 125° C. to 135° C. with stirring at 500 rpm using a magnetic stirrer. The bleached fabric was separated from the Soxhlet, transferred to a glass evaporation dish, and dried in a vacuum dryer maintained at 60° C. under vacuum (≤2 mmHg) for 12 hours or more.

To observe the dye removal rate during the bleaching treatment, about 0.3 ml of the extraction mixed solution in the flask was taken at intervals of 2.5 minutes, and then quantified anisole was added to prepare a sample for chromaticity measurement that was five-fold diluted. Next, after being transferred to a cuvette having a path length of 10 mm, the relative absorbance for each sample was measured at each wavelength where maximum absorption occurred ($\lambda_{max}$; 600 nm for Raw Material 1, 512 nm for Raw Material 2, 577 nm for Raw Material 3, 464 nm for Raw Material 6) using a UV-Vis spectrophotometer (manufacturer: Thermo Scientific, model name: GENESYS 180). On the basis of the relative absorbance, a time when dye extraction dominantly occurred was measured. In addition, the bleached fabric was weighed using a high-precision scale to calculate the difference in weight before and after the bleaching treatment. Table 4 below shows L*, a*, and b* values measured using a spectrophotometer.

Example 20

The fabric was treated in the same manner as in Example 19, except for using the red waste polyester fabric of Raw Material 2 as the colored waste polymer raw material. Table 4 shows changes in weight and color measured before and after the bleaching treatment.

Example 21

The fabric was treated in the same manner as in Example 19, except for using the black waste polyester fabric of Raw Material 3 as the colored waste polymer raw material. Table 4 shows changes in weight and color measured before and after the bleaching treatment.

Example 22

The fabric was treated in the same manner as in Example 19, except for using the brown waste polyester fabric of Raw Material 6 as the colored waste polymer raw material. Table 4 shows changes in weight and color measured before and after the bleaching treatment.

TABLE 4

| Class-ification | Raw material | Original color of raw material | Before extraction | | | After extraction | | | Weight change |
|---|---|---|---|---|---|---|---|---|---|
| | | | L* | a* | b* | L* | a* | b* | Δ (%) |
| Example 19 | Raw Material 1 | Navy blue | 19.1 | 1.6 | −9.5 | 82.7 | 0.2 | 1.2 | 2.5 |
| Example 20 | Raw Material 2 | Red | 41.9 | 53.9 | 18.2 | 82.3 | 0.1 | 0.7 | 3.0 |
| Example 21 | Raw Material 3 | Black | 19.0 | 0.8 | −0.9 | 83.5 | −0.1 | 1.9 | 2.8 |
| Example 22 | Raw Material 4 | Brown | 33.9 | 12.2 | 12.3 | 81.4 | −1.1 | −0.8 | 2.0 |

*Weight change: rate of weight reduction by dye removal [$\Delta = (m_0 - m)/m_0 \times 100$ (%)]

It was confirmed that the time when most of the color-expressing foreign substances s were removed from the waste polymer fabric containing the ester functional group varied depending on the colors of the fabrics, which was determined on the basis of the time when the extraction solution was flushed from the Soxhlet extractor and number of cycles. In the case of using the red waste polyester fabric in Example 20, most of the dye was removed by flushing the extraction solution two times. However, in cases of using relatively dark Raw Materials 1, 3, and 6 in Examples 19 and 21 to 22, it is confirmed that most of the dyes were able to be removed after flushing the extraction solution three times. This demonstrates that although the removal rates of the color-expressing foreign substances may vary, most foreign substances are removable regardless of the colors of the foreign substances by allowing the extract to be in continuous contact.

The changes in the weight and color values of the fabrics before and after the bleaching treatment shown in Table 4 above are measurement results for the fabrics when the bleaching treatment was performed for 1 hour under the same conditions as shown in Example 19, and the number of cycles the extraction solution in the Soxhlet extractor was flushed during the bleaching treatment process is 3 or more.

As shown in Table 4, all the waste polyester fabrics bleached in Examples 19 to 22 exhibited lightness values L* of 80 or more. In addition, the a* and b* values, expressing differences in saturation, were confirmed to have absolute values close to 0, not exceeding 2. This demonstrates that the continuous bleaching method based on the extractant reflux exhibits a significantly excellent effect in removing the color-expressing foreign substances.

As shown in Table 4, the amount of dye contained in each fabric was estimated through the changes in the weight of the colored waste polyester fabrics before and after the bleaching. It was seen that in the colored waste polyester fabric used in Examples 19 to 22, a mass of dye corresponding to about 2% to 3% of the weight of each fabric was dyed.

Method for Selecting Polymer Containing Ester Functional Group Through Color Discrimination

Example 23

About 0.1 g of the navy blue polyester fabric (dye: Disperse Blue 56) of Raw Material 8 was put into a 50-ml vial containing 10.0 g of anisole (methoxybenzene) heated to and maintained at a temperature of 130° C., prepared as an extractant, and stirred using a magnetic stirrer at 300 rpm for 10 minutes. The polyester fabric was taken out using a tweezer, washed by being dipped using 10.0 g of the same extractant (anisole) maintained at 90° C. in a 50-ml vial bottle for about 1 to 2 seconds, transferred to a glass evaporation dish, placed in a vacuum dryer maintained at 60° C. under vacuum (≤2 mmHg), and then dried for 12 hours or more to prepare a bleached fabric. The color of the bleached fabric was measured using a spectrophotometer as L*, a*, and b* values, which were then converted once more to HSV values. HSV is a method for differentiating colors using coordinates of Hue, Saturation, and Value, where a specific color is represented as a point inside or the surface of a color space having a cylinder or cone form. H, a color value, expresses the visible light spectrum as a ring-shaped color wheel ranging from 0 to 360 degrees, which means a relative arrangement angle at which a color is positioned when red, which has the longest wavelength, is set to 0 degrees. S, a saturation value, expresses the degree of darkness of a specific color, where a saturation value of 100% indicates the darkest color and a saturation value of 0% indicates an achromatic color with the same lightness. V, a lightness value, represents the degree of lightness with white, red, and the like being 100% and black being 0%.

Example 24

The fabric was treated in the same manner as in Example 23, except for using the red polyester fabric of Raw Material 9 (dye: Disperse Red 1) as the colored polymer raw material containing the ester functional group. Then, the color of the fabric was measured and then converted into HSV values.

Example 25

The fabric was treated in the same manner as in Example 23, except for using the red polyester fabric of Raw Material 10 (dye: Disperse Red 9) as the colored polymer raw material containing the ester functional group. Then, the color of the fabric was measured and then converted into HSV values.

Example 26

The fabric was treated in the same manner as in Example 23, except for using the black polyester fabric of Raw Material 11 (dye: Dystar Dianix Deep Black Plus), in which 82% polyester and 18% spandex were blended, as the colored polymer raw material containing the ester functional group. Then, the color of the fabric was measured and then converted into HSV values.

Example 27

The fabric was treated in the same manner as in Example 23, except for using the orange nylon fabric of Raw Material 13 (dye: Acid Orange 116) as the colored polymer raw material other than the polymer containing the ester functional group. Then, the color of the fabric was measured and then converted into HSV values.

Example 28

The fabric was treated in the same manner as in Example 23, except for using the orange wool fabric of Raw Material 15 (dye: Acid Orange 116) as the colored polymer raw material other than the polymer containing the ester functional group. Then, the color of the fabric was measured and then converted into HSV values.

Example 29

The fabric was treated in the same manner as in Example 23, except for using the orange silk fabric of Raw Material 17 (dye: Acid Orange 116) as the colored polymer raw material other than the polymer containing the ester functional group. Then, the color of the fabric was measured and then converted into HSV values.

Example 30

The fabric was treated in the same manner as in Example 23, except for using the yellow acrylic fabric of Raw Material 19 (dye: Basic Yellow 28) as the colored polymer raw material other than the polymer containing the ester functional group. Then, the color of the fabric was measured and then converted into HSV values.

Example 31

The fabric was treated in the same manner as in Example 23, except for using the yellow cotton fabric of Raw Material 21 (dye: Reactive Orange 107) as the colored polymer raw material other than the polymer containing the ester functional group. Then, the color of the fabric was measured and then converted into HSV values.

Example 32

The fabric was treated in the same manner as in Example 23, except for using the yellow rayon fiber fabric of Raw Material 23 (dye: Reactive Orange 107) as the colored polymer raw material other than the polymer containing the ester functional group. Then, the color of the fabric was measured and then converted into HSV values.

Example 33

The fabric was treated in the same manner as in Example 23, except for using ethyl benzoate as the extractant.

Example 34

The raw material was treated in the same manner as in Example 23, except for using ethoxybenzene as the extractant.

Comparative Example 5

The fabric was treated in the same manner as in Example 23, except for using triethyl phosphate as the extractant.

Comparative Example 6

The raw material was treated in the same manner as in Example 23, except for using butyl butyrate as the extractant.

Comparative Example 7

The raw material was treated in the same manner as in Example 23, except for using methoxycyclohexane as the extractant.

Comparative Example 8

The raw material was treated in the same manner as in Example 23, except for using p-xylene as the extractant.

Comparative Example 9

The raw material was treated in the same manner as in Example 23, except for using morpholine as the extractant.

Comparative Example 10

The raw material was treated in the same manner as in Example 23, except for using methylpyrrolidone as the extractant.

Comparative Example 11

The raw material was treated in the same manner as in Example 23, except for using dimethyl sulfoxide as the extractant.

Comparative Example 12

The fabric was treated in the same manner as in Comparative Example 10, except for using the orange nylon fabric of Raw Material 13 (dye: Acid Orange 116) as a colored polymer raw material other than the polymer containing the ester functional group.

Comparative Example 13

The fabric was treated in the same manner as in Comparative Example 10, except for using the orange wool fabric of Raw Material 15 (dye: Acid Orange 116) as a colored polymer raw material other than the polymer containing the ester functional group.

Comparative Example 14

The fabric was treated in the same manner as in Comparative Example 10, except for using the orange silk fabric of Raw Material 17 (dye: Acid Orange 116) as a colored polymer raw material other than the polymer containing the ester functional group.

Comparative Example 15

The fabric was treated in the same manner as in Comparative Example 10, except for using the yellow acrylic fabric of Raw Material 19 (dye: Basic Yellow 28) as a colored polymer raw material other than the polymer containing the ester functional group.

Comparative Example 16

The fabric was treated in the same manner as in Comparative Example 10, except for using the yellow cotton fabric of Raw Material 21 (dye: Reactive Orange 107) as a colored polymer raw material other than the polymer containing the ester functional group.

Comparative Example 17

The fabric was treated in the same manner as in Comparative Example 10, except for using the yellow rayon fabric of Raw Material 23 (dye: Reactive Orange 107) as a colored polymer raw material other than the polymer containing the ester functional group.

Comparative Example 18

The fabric was treated in the same manner as in Comparative Example 11, except for using the orange nylon fabric of Raw Material 13 (dye: Acid Orange 116) as a colored polymer raw material other than the polymer containing the ester functional group.

Comparative Example 19

The fabric was treated in the same manner as in Comparative Example 11, except for using the orange wool fabric of Raw Material 15 (dye: Acid Orange 116) as a colored polymer raw material other than the polymer containing the ester functional group.

Comparative Example 20

The fabric was treated in the same manner as in Comparative Example 11, except for using the orange silk fabric of Raw Material 17 (dye: Acid Orange 116) as a colored polymer raw material other than the polymer containing the ester functional group.

Comparative Example 21

The fabric was treated in the same manner as in Comparative Example 11, except for using the yellow acrylic fabric of Raw Material 19 (dye: Basic Yellow 28) as a colored polymer raw material other than the polymer containing the ester functional group.

Comparative Example 22

The fabric was treated in the same manner as in Comparative Example 11, except for using the yellow cotton fabric of Raw Material 21 (dye: Reactive Orange 107) as a colored polymer raw material other than the polymer containing the ester functional group.

Comparative Example 23

The fabric was treated in the same manner as in Comparative Example 11, except for using the yellow rayon fabric of Raw Material 23 (dye: Reactive Orange 107) as a colored polymer raw material other than the polymer containing the ester functional group.

Comparison of Effect of Extractant Depending on Polymer Type

Figure 4:
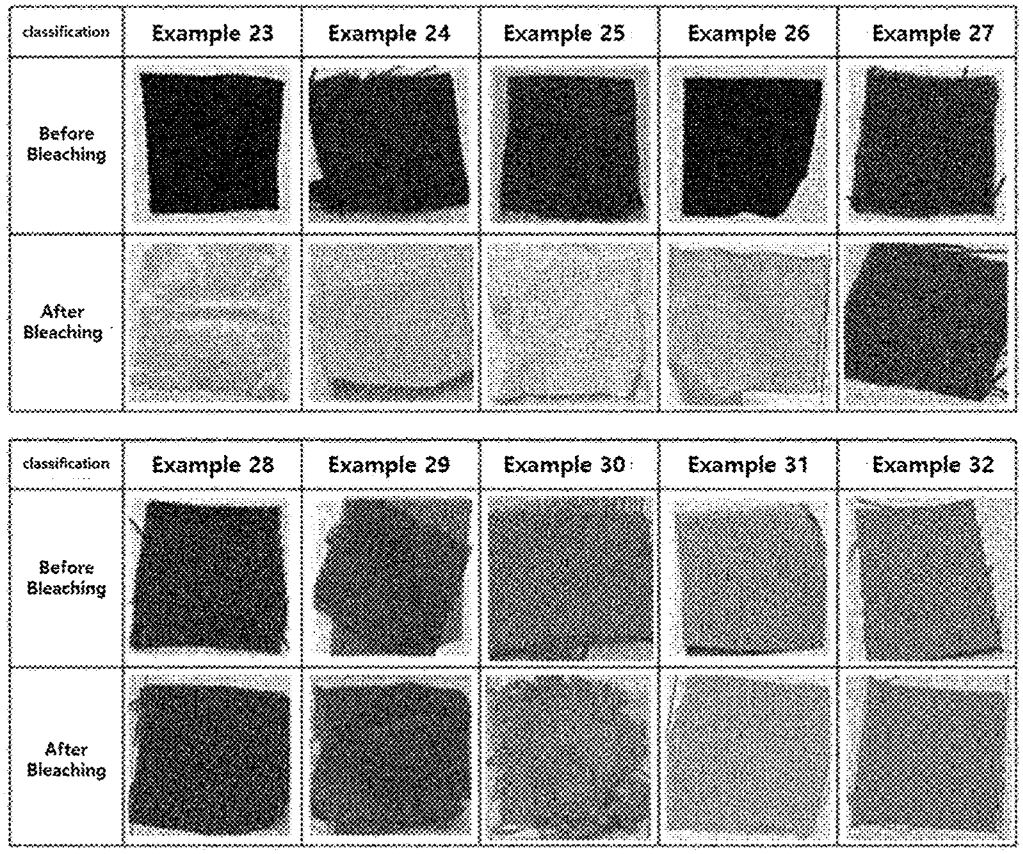
FIG. 4 shows images of polyester-based fabrics and fabrics other than the polyester-based fabrics before and after being bleached for comparison, showing the bleaching effect of anisole on colored polymers containing ester functional groups and other types of colored polymers, according to Examples 23 to 32 of the present disclosure.

To compare the bleaching effect of the extractant (anisole) on the colored polymers containing the ester functional groups and other types of colored polymers, FIG. 4 shows images of the fabrics before and after the bleaching treatment after bringing the prepared different types of colored polymer fabrics into contact with anisole heated to 130° C. for 10 minutes in the same manner as described in Example 23 for comparison.

As shown in FIG. 4, when performing the bleaching process using anisole as the extractant, it was confirmed that only the dyes in the polyester and polyester-based fabrics prepared as the colored polymer raw materials containing the ester functional group were eluted.

In the case of the polyester and polyester-based fabrics, the colors after the bleaching treatment clearly turned bright to a visually distinguishable level regardless of the colors and lightness of the starting raw material, confirming that the dyes were eluted. However, in the case of the fabrics other than the polyester-based fabrics, it was confirmed that almost no color change occurred after the bleaching process.

The measured color values of the fabrics bleached by being brought into contact with anisole in Examples 23 to 32 were converted into HSV values. Table 5 shows the results thereof.

TABLE 5

| Classification | Raw material | Types of polymer | Dye | Classification | H | S | V |
|---|---|---|---|---|---|---|---|
| Example 23 | Raw Material 8 | Polyester | Disperse Blue 56 | Before bleaching | 222.9 | 34.5 | 24.0 |
| | | | | After bleaching | 20.0 | 1.5 | 84.6 |
| Example 24 | Raw Material 9 | Polyester | Disperse Red 1 | Before bleaching | 357.5 | 78.5 | 59.8 |
| | | | | After bleaching | 9.3 | 23.7 | 96.0 |

TABLE 5-continued

| Classification | Raw material | Types of polymer | Dye | Classification | H | S | V |
|---|---|---|---|---|---|---|---|
| Example 25 | Raw Material 10 | Polyester | Disperse Red 9 | Before bleaching | 348.9 | 79.7 | 74.7 |
| | | | | After bleaching | 344.6 | 14.6 | 94.7 |
| Example 26 | Raw Material 11 | 82% Polyester +18% spandex | Dystar Dianix Deep Black Plus | Before bleaching | 240.0 | 7.1 | 16.5 |
| | | | | After bleaching | 33.8 | 7.8 | 78.2 |
| Example 27 | Raw Material 13 | Nylon | Acid Orange 116 | Before bleaching | 34.1 | 86.1 | 100.0 |
| | | | | After bleaching | 33.6 | 84.4 | 100.0 |
| Example 28 | Raw Material 15 | Wool | Acid Orange 116 | Before bleaching | 33.0 | 100.0 | 97.9 |
| | | | | After bleaching | 34.0 | 100.0 | 97.7 |
| Example 29 | Raw Material 17 | Silk | Acid Orange 116 | Before bleaching | 33.9 | 100.0 | 100.0 |
| | | | | After bleaching | 33.2 | 100.0 | 100.0 |
| Example 30 | Raw Material 19 | Acryl | Basic Yellow 28 | Before bleaching | 17.1 | 90.1 | 68.8 |
| | | | | After bleaching | 16.6 | 89.2 | 68.1 |
| Example 31 | Raw Material 21 | Cotton | Reactive Orange 107 | Before bleaching | 21.1 | 82.3 | 81.5 |
| | | | | After bleaching | 20.8 | 81.1 | 81.1 |
| Example 32 | Raw Material 23 | Rayon | Reactive Orange 107 | Before bleaching | 14.1 | 82.0 | 64.8 |
| | | | | After bleaching | 13.0 | 80.5 | 62.9 |

As shown in Table 5 above, it is confirmed that among the HSV values of the polyester and polyester-based fabrics in which the bleaching processes were performed according to Examples 23 to 26, both the saturation value S of 40 or less and the lightness value V of 70 or more are satisfied. After bleaching, the saturation value decreases and the brightness value increases, indicating that the color-expressing dyes were extracted from the fabrics during the bleaching process.

On the other hand, as shown in Table 5 above, the color values of the fabrics other than the polyester bleached in Examples 27 to 32 were not significantly different from those before being treated with the extractant and failed to satisfy both the S value of 40 or less and the V value of 70 or more.

In addition, as shown in Table 5 above, in the case of the polyester-based fabric in which the polyester and the spandex were blended and processed, the S and V values before bleaching were 7.1 and 16.5, respectively, indicating an extremely dark color. However, the V value of the fabric after bleaching was increased to 78.2, confirming that the dye was removed. This demonstrates that the extractant presented in the present disclosure functions and enables the dye to be removed from the colored polymer fabric having a form in which the colored polymer containing the ester functional group and other types of polymers are blended and processed, which may also improve selection yield of the colored polymer containing the ester functional group.

This may demonstrate that the chemical selection in the method for selectively removing only the dye from the colored polymer containing the ester functional group by bringing the extractant presented in the present disclosure into contact with the colored polymer mixture. In addition, it was confirmed that the selection was easily performed in a relatively short amount of time through color differentiation of the polymer after the bleaching treatment.

Comparison of Bleaching Effects Depending on Extractant Type

Examples 23, 33, and 34 and Comparative Examples 5 to 9 were performed to distinguish bleaching effects depending on different extractants. The same conditions were applied, except for the extractants used during the bleaching process, and the navy blue polyester fabric of Raw Material 8 was used as the colored polymer raw material containing the ester functional group.

Figure 5:
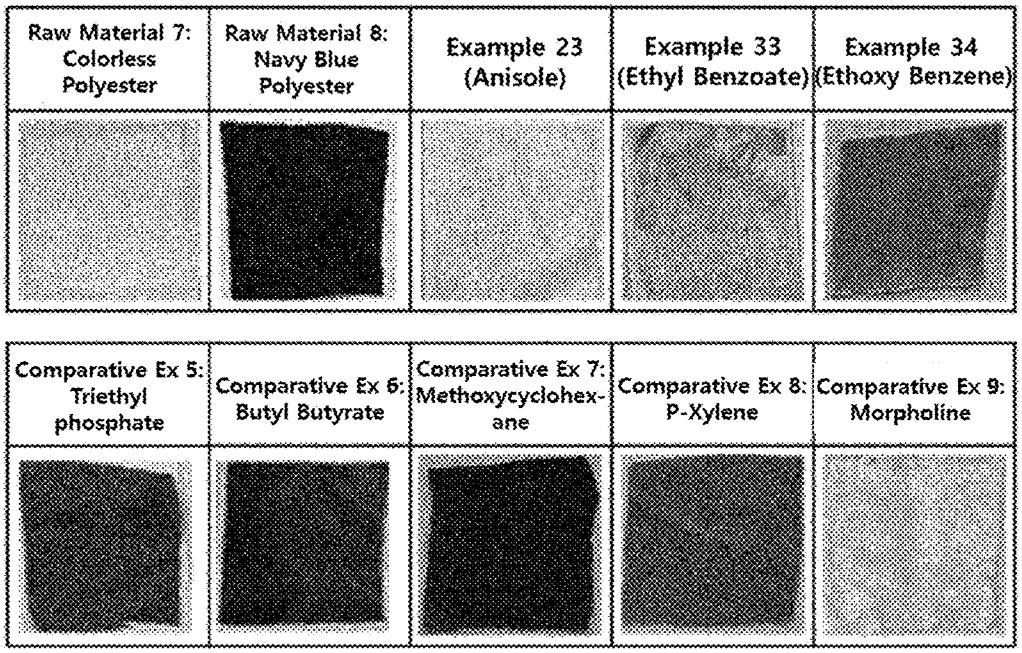
FIG. 5 shows images of colored polyester fabrics bleached using compounds represented by Formula 1 or 2 included in the present disclosure and other compounds for comparison, according to Examples 23, 33, and 34 and Comparative Examples 5 to 9 of the present disclosure.

FIG. 5 shows images of the colorless polyester fabric of Raw Material 7 and the fabrics after bleaching Raw Material 8 in Examples 23, 33, and 34, and Comparative Examples 5 to 9. In addition, Table 6 below shows the colors of the fabric measured after bleaching as HSV values.

TABLE 6

| Classification | Raw material and extractant | H | S | V |
|---|---|---|---|---|
| Raw Material 7 | Colorless polyester | 90.0 | 0.8 | 92.3 |
| Raw Material 8 | Navy blue polyester | 222.9 | 34.5 | 24.0 |
| Example 23 | Anisole | 20.0 | 1.5 | 84.6 |
| Example 33 | Ethyl benzoate | 202.6 | 31.8 | 74.6 |
| Example 34 | Ethoxybenzene | 202.7 | 23.0 | 77.2 |
| Comparative Example 5 | Triethyl phosphate | 204.9 | 74.1 | 50.1 |
| Comparative Example 6 | Butyl butyrate | 209.6 | 58.3 | 48.1 |
| Comparative Example 7 | Methoxycyclohexane | 208.0 | 70.2 | 41.6 |
| Comparative Example 8 | p-Xylene | 204.5 | 45.8 | 65.2 |
| Comparative Example 9 | Morpholine | 41.5 | 10.9 | 93.2 |

In the case of the fabric treated in Example 23, the S value was measured to be 1.5, and the V value was measured to be 84.6, confirming that the color values were close to those of the colorless polyester fabric of Raw Material 7. In addition, even in the case of Examples 33 and 34, using ethyl benzoate and ethoxybenzene, it was confirmed that the colors of the fabrics after bleaching turned noticeably brighter than the original colors of the fabrics. Furthermore, the color values measured using a spectrophotometer satisfied the selection conditions presented in the present disclosure. As a result, it is confirmed that the dyes are effectively removable.

As shown in FIG. 5, in the case of the solvents used as the extractants in Comparative Examples 5 to 8, although the colors of the fabrics after being treated with the extractants appeared to be relatively lighter than navy blue, the original color of Raw Material 8, but the level of bleaching was insignificant, visually confirming that a large amount of dyes still remained. This demonstrates that the solvents are inappropriate for use as the extractants because the coordinate values, expressing the colors of the fabrics, were also greater in saturation values and lower in lightness values than those of the selection standard presented in the present disclosure.

Methoxycyclohexane used in Comparative Example 7 has a structure similar to the formula of the additive claimed in the present disclosure but has a structure having a form modified into a saturated cycloalkane having the same number of carbon atoms rather than an aromatic ring, which is the main functional group of the compound. In the case of using methoxycyclohexane as the extractant, the dye removal effect is much poorer than that in the case of using anisole, the extractant represented by the formula according to the present disclosure (Example 23), as shown in FIG. 5.

Morpholine used in Comparative Example 9 removed the dye to a level that satisfied both the S value of 40 or less and the V value of 70 or more, the values for the selection standard presented in the present disclosure. However, the color of the dye was changed because morpholine reacted directly with the color-expressing dye. In addition, it was observed that a portion of the dye remained in a polymer matrix.

Figure 6:
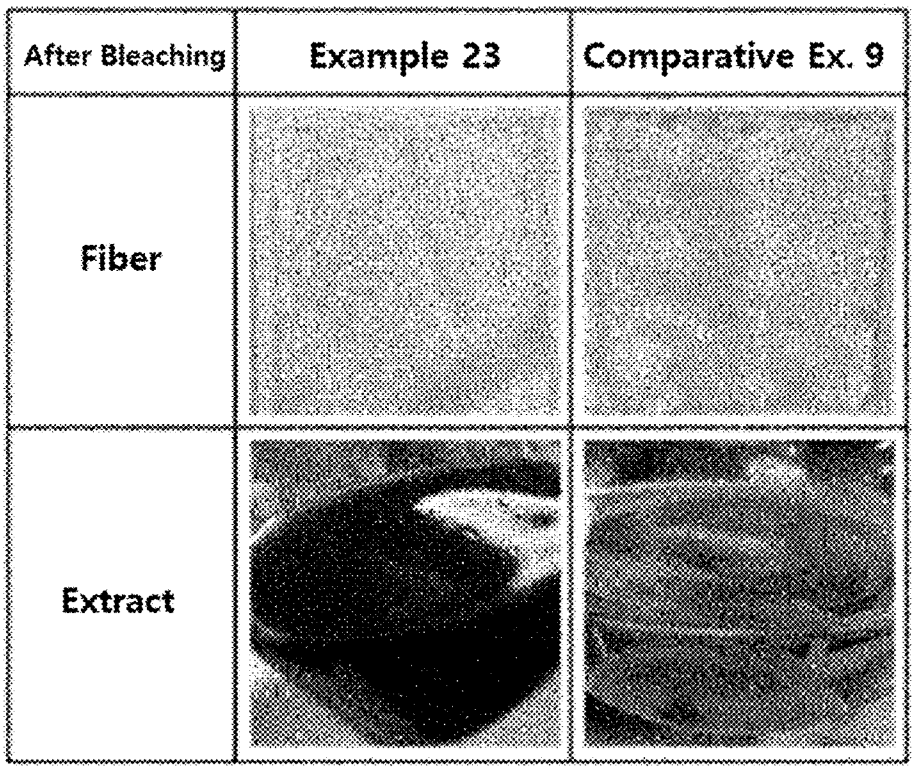
FIG. 6 shows images of colored polyester fabrics after being bleached using anisole and morpholine as extractants and residues of the solvents for comparison, according to Example 23 and Comparative Example 9 of the present disclosure.

In FIG. 6, the effects of anisole in Example 23 and morpholine in Comparative Example 9, both serving as the extractants, on the colored polymer fabric containing the ester functional group are compared. In both Example 23 and Comparative Example 9, the same navy blue polyester fabric of Raw Material 8 was used as the raw material. However, when treated with morpholine, the navy blue dye was transformed into orange. In addition, it was observed that the fabric showed a subtle orange color even after bleaching, confirming that the transformed dye remained. This occurs due to the chemical modification of the dye chromophore, differing from the effect of the present disclosure in which bleaching progresses by physically separating the dye component from the polymer matrix.

Comparison of Bleaching Effects Depending on Extractant and Polymer Type

Figure 7:
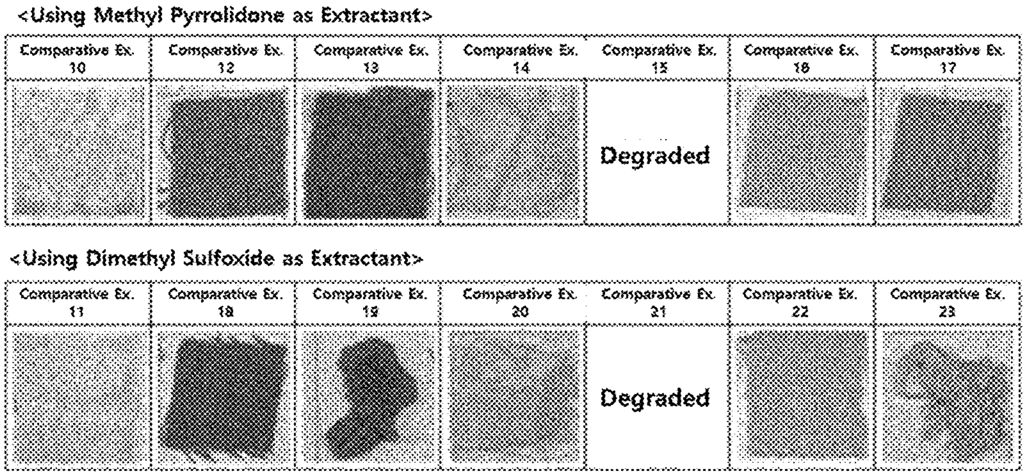
FIG. 7 shows images of fabrics bleached using methylpyrrolidone and dimethyl sulfoxide, compounds other than compounds represented by Formula 1 or 2 included in the present disclosure, for comparison, according to Comparative Examples 10 to 23 of the present disclosure.

Comparative Examples 10 to 23 were performed to demonstrate bleaching effects of the compounds not represented by Formula 1 or 2, according to the present disclosure, on various types of colored polymers. The same conditions were applied as in Example 23, except for the compounds used as the extractants. FIG. 7 shows the results of bleaching the colored polyester fabrics and colored fabrics other than the polyester-based fabrics as the raw materials of the colored polymer containing the ester functional group and other types of colored polymer, respectively.

As shown in FIG. 7, when bleaching the polyester fabrics of Comparative Examples 10 and 11, the dyes were confirmed to be removed from the fabrics. However, when bleaching the colored fabrics other than the polyester-based fabrics, the fabrics were observed to be deformed in cases other than Comparative Examples 16, 17, and 22. In particular, the acrylic fabrics of Comparative Examples 15 and 21 were completely degraded after being treated with the extractant and thus were unrecoverable. This demonstrates that some of the compounds other than the compounds represented by the formula according to the present disclosure are inappropriate to be applied to the selection process because although the compounds, other than the compounds expressed by the formula according to the present disclosure, may exhibit bleaching effects on the colored polymer containing the ester functional group, reactions other than bleaching may occur between other types of polymers in some cases, making it difficult to select only the colored polymer containing the ester functional group.

Confirmation of Selective Bleaching Effects Under Conditions where Polymers are Mixed When applying the technology for chemically selecting the colored polymer containing the ester functional group of the present disclosure to actual processes, considering that the extractant was brought into contact while various types of polymers were mixed, the raw materials same as those used in Examples 23 to 32 were mixed, and then the following experiment was performed.

Example 35

After mixing 0.3 g of each of the colored polyester-based fabrics of Raw Materials 8 to 11 and the colored fabrics, other than polyester-based fabrics, of Raw Materials 13, 15, 17, 19, 21, and 23, a Soxhlet extractor was used for bleaching.

The same anisole as in Example 23 was used as the extractant. After being brought into contact with the extractant, the fabrics were washed with ethanol, transferred to a glass evaporation dish, and dried in a vacuum dryer maintained at 60° C. under vacuum (≤2 mmHg) for 12 hours or more. The colors of the bleached fabrics were measured and then converted into HSV values.

Figure 8:
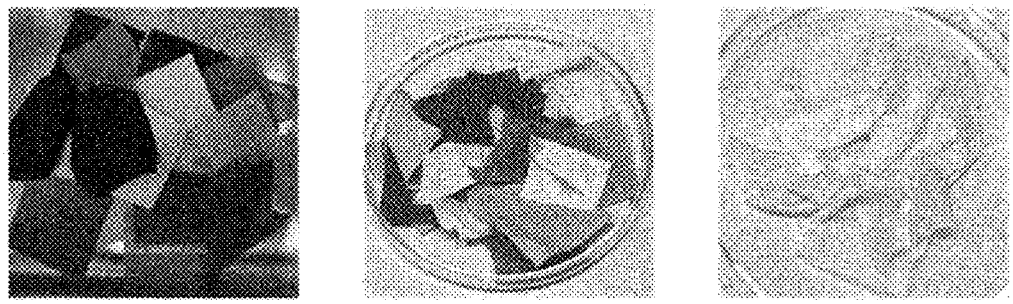
FIG. 8 shows images of results where a colored polymer mixture is bleached using a Soxhlet extractor, according to Example 35 of the present disclosure.

FIG. 8 shows changes in the colors of the colored polymer fabric mixture before and after the bleaching treatment through the Soxhlet extraction method. As shown in FIG. 8, when bringing the extractant into contact while various types of polymer fabrics were mixed, it was observed that the dyes were able to be selectively removed only from the specific fabrics (polyester-based fabrics of Raw Materials 8 to 11).

Figure 9:
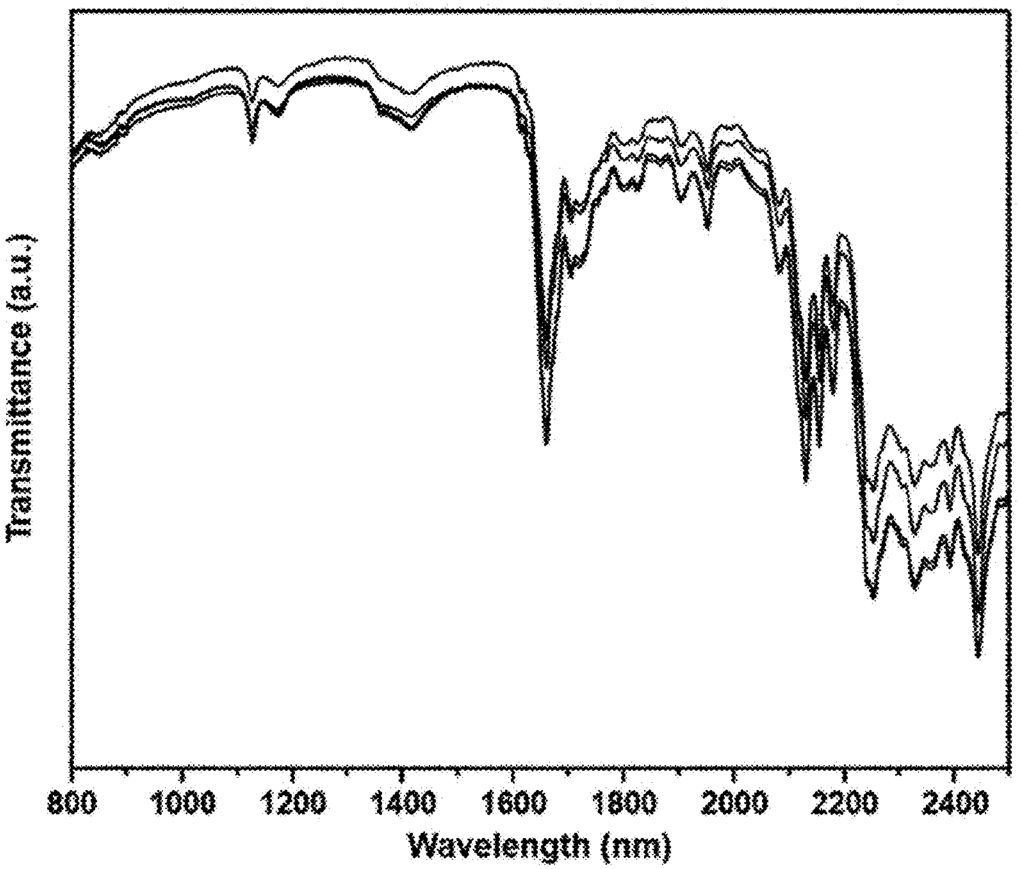
FIG. 9 shows spectral spectrum results of fabrics whose S and V values satisfy standard values among fabrics bleached using a Soxhlet extractor, according to Example 35 of the present disclosure.

FIG. 9 shows the results of measuring the spectral spectrum using a near-infrared spectrophotometer by selecting fabrics that satisfy both the S value of 40 or less and the V value of 70 or more when calculating the HSV color values among the bleached fabrics. As shown in FIG. 9, the fabrics that satisfied the conditions specified above had the same tendency of spectral spectrum, a type of spectral spectrum found in polyesters. This demonstrates the fact that the dye removal effect of the extractant was selectively functioned only for the colored polymer containing the ester functional group.

From this, a simple and efficient process capable of selectively removing the dyes from the colored polymer containing the ester functional group using the extractant, included in the present disclosure, even under the conditions where various types of polymers are mixed and of effectively selecting the polymer containing the ester functional group by undergoing a step of measuring the colors of the polymers after bleaching may be implemented.

Comparison of Chemical Depolymerization and Quality of Depolymerized Product Depending on Amount of Color-Expressing Foreign Substance Contained in Waste Polymer Raw Material In the examples described above, an effective method for removing the color-expressing foreign substances from the colored waste polymer raw materials containing the ester functional group was demonstrated by applying the extractants according to the present disclosure. Waste polymers containing ester bonds and free of color-expressing foreign substances may be appropriately used as raw materials for physical or chemical regeneration.

Examples 36 to 37 and Comparative Example 24 were performed to compare the quality of depolymerized products depending on the degree of the waste polymer raw material containing the color-expressing foreign substances when applying the waste polymer raw material containing the ester functional group to depolymerization for product synthesis. The degree of removing the foreign substances from the colored polymer raw material varied to be applied to the depolymerization, and the quality of the synthesized products was compared.

Comparative Example 24

(a) Depolymerization

About 10 g of waste clothing made of a material containing an ester functional group prepared from a navy blue fleece jacket made of 100% polyester discarded after consumption of Raw Material 24 and about 38.8 g of ethylene glycol, a polar solvent of dihydric alcohol, were put into a three-neck flask and heated with stirring using a magnetic stirrer after installing a reflux condenser. When the reaction mixture reached 197° C. or a reflux temperature, catalysis was initiated by adding about 0.114 g of a zinc acetate catalyst. After adding the catalyst, the reaction was performed for 2 hours under atmospheric pressure conditions using a condenser with one end exposed to atmospheric pressure while maintaining the temperature constant within the range of ±1° C. based on the reaction temperature.

At the end of the reaction, a trace of the reaction mixture was taken and prepared as a sample for quantification. The reaction yields for depolymerized monomers and dimers were measured using high-performance liquid chromatography (HPLC with C18 column, UV detector (λ=254 nm)) calibrated with each standard sample. A mixed solution of methanol: water in a volume ratio of 70:30 was used as a mobile phase for HPLC analysis, and the total flow rate was maintained at 0.7 ml/min.

All the reaction mixtures except for the traces of samples taken for quantification were filtered using cellulose acetate filter paper (pore size: 0.45 μm). After filtration, some of the solid-phase compounds and dyes in addition to monomers, including dimers, oligomers, unreacted polymers, and the like, in the filter paper were obtained as a non-volatile phase.

The yields of the products in the reactants were calculated using the following equation.

$$\text{Yield of monomer, } Y_{BHET}(\%) = M_{BHET}/M_0 \times 100$$

$$\text{Yield of dimer, } Y_{Dimer}(\%) = M_{Dimer}/M_0 \times 100$$

$$\text{Yield of oligomer, } Y_{Oligomer}(\%) = M_{Oligomer}/M_0 \times 100$$

$$\text{Yield of by-product (MHET), } Y_{MHET}(\%) = M_{MHET}/M_0 \times 100$$

Here, $M_{BHET}$, $M_{Dimer}$, $M_{Oligomer}$, and $M_{MHET}$ represent the number of BHET, dimer, oligomer, and MHET moles quantified by HPLC, respectively, and $M_0$ represents the number of moles of repeating units in the structure of the added polymer.

(b) Recovery of depolymerized product: Excess distilled water (1 L) was added to the reaction product obtained as a filtrate through the filtration process in (a). Then, the resulting product was left in a reservoir maintained at 4° C. for 12 hours to recrystallize the depolymerized product. Next, the filtration method used in (a) was reapplied to remove a large amount of moisture as the filtrate, and then a non-volatile phase was obtained. The resulting non-volatile phase was then transferred to a vacuum dryer maintained at a temperature of 60° C. and dried in vacuo for 12 hours or more to obtain a depolymerized product (BHET) containing dye as an impurity.

(c) Chromaticity measurement of depolymerized product: About 200 mg of the obtained BHET was taken. Then, using a pellet-forming mold (Pike Evacuable KBr Die Kit) and a hydraulic press (Pike CrushIR), a 13-mm disk was prepared as a pellet sample for spectrophotometric measurement. The sample was analyzed using the spectrophotometer described in Example 1 to measure L*, a*, and b* values.

Example 36

A navy blue fleece jacket made of 100% polyester discarded after consumption of Raw Material 24 was used as a colored waste clothing raw material to extract dye in the same manner as in Example 9 by being in contact with anisole maintained at a temperature of 110° C. for 10 minutes. Next, after being washed with anisole at the same temperature one time, 10 g of the waste clothing raw material partially bleached by being dried in vacuo was prepared as a raw material for depolymerization.

Depolymerization and a product recovery process were performed on the raw material in the same manner as in Comparative Example 24 to obtain a BHET product. Using a spectrophotometer, L*, a*, and b* values for the sample were measured.

Example 37

The raw material was treated in the same manner of preparing the raw material for depolymerization as in Example 36, except for not undergoing the drying process after being bleached by being in contact with the extractant. Then, 10 g of the partially bleached waste clothing raw material was prepared as the raw material for depolymerization.

After adding both ethylene glycol and 10 g of the raw material for depolymerization, prepared above, to a three-neck flask, anisole (methoxybenzene) was added so that the total amount thereof reached about 22.5 g to prepare a reactant. The reaction was conducted in the same manner as the depolymerization method in Comparative Example 24 (a), except that the catalysis was initiated by adding about 0.20 g of a potassium acetate catalyst when the reaction mixture was heated and reached the reflux temperature.

To differentiate the degree of removing the foreign substances between Example 36 and Comparative Example 24, the mixture obtained after the reaction underwent an additional purification process as follows before product recovery. About 200 g of distilled water at 95° C. to 100° C. was added to the filtrate obtained by filtration after the depolymerization method of (a) and then stirred while maintaining a constant temperature of 75° C. After 1 hour, stirring was stopped to induce phase separation. After separating only an aqueous solution layer from an organic phase containing most of the extractant and dye, a BHET product was obtained by the same method for recovering the depolymerized product as in Comparative Example 24 (b). Then, the same method as in Comparative Example 24 (c) was applied to prepare a pelletized sample, and L*, a*, and b* values for the sample were measured using a spectrophotometer.

In Examples 36 to 37 and Comparative Example 24, the depolymerization was conducted extremely rapidly in all cases as the low-density polymers were used as the raw materials for depolymerization. As a result, it was observed that degradation of all fibers progressed within 30 minutes (conversion rate=100%), but the fibers were allowed to be left for a sufficient amount of reaction time (2 hours) to reach reaction equilibrium. To compare the quality of the product obtained after completion of the depolymerization, Table 7 shows reaction performance evaluated through quantitative analysis of the products and L*, a*, and b* values measured using a spectrophotometer for the sample obtained by pelletizing the prepared monomer.

be 85.2%, a slight increase compared to that in Comparative Example 24. In addition, although the color of the BHET prepared through the purification process faded, the color was still observed at a high level due to residues of the foreign substances that were difficult to be removed during the purification process. In the color coordinate values measured using the spectrophotometer by pelletizing the BHET product, the lightness value L* was measured to be about 64, and a* and b* values, expressing differences in saturation, were measured to be about 15 and 18, respectively, which were slightly lower than those of the product (Comparative Example 24) prepared without undergoing the process of removing the dye using the extractant after the reaction.

In Example 37, after undergoing the process of removing the color-expressing substances using the extractant under the same conditions as in Example 36, the bleached waste clothing raw material where the extractant remained because the drying process was not performed was applied to the depolymerization. After completion of the reaction, about 87% of BHET was obtained, which was greater than those in Example 36 and Comparative Example 24.

In Example 37, substances having a high molecular weight, such as dimers and oligomers, were separated from the reaction product obtained by depolymerization through physical filtration. When lowering the temperature of the mixture to 100° C. or lower after adding water to purify the monomers, the thermodynamically unstable phase separation occurred. When the boundary area of the phases became clear, it was seen that an organic layer composed of a dominant amount of extractant was separable from an aqueous solution phase. In addition, a tendency in which residues

TABLE 7

| Classification | Reaction temperature | Depolymerization yield (%) | | | | | Color coordinate value of monomer | | | | |
|---|---|---|---|---|---|---|---|---|---|---|---|
| | | BHET | Dimer | Oligomer | MHET | L* | a* | b* | H | S | V |
| Comparative Example 24 | 197° C. | 83.6 | 4.9 | 10.3 | 1.3 | 51.3 | 18.8 | 19.7 | 16.4 | 45.0 | 63.8 |
| Example 36 | 197° C. | 85.2 | 4.8 | 8.5 | 1.5 | 64.3 | 15.3 | 18.2 | 18.2 | 41.5 | 61.6 |
| Example 37 | 153° C. | 86.7 | 4.8 | 7.1 | 1.4 | 94.6 | −0.2 | 0.4 | 60.0 | 0.4 | 93.9 |

As shown in Table 7 above, when applying the colored waste clothing raw material not undergoing the bleaching process based on the extractant in Comparative Example 24 to the depolymerization under the conditions described above, the BHET was measured to be obtainable at about 83.6% when reaching the final reaction time. The obtained BHET product showed a completely different color from navy blue, the original color of the waste clothing raw material used. In the color coordinate values measured using the spectrophotometer by pelletizing the BHET product, the lightness value L* was measured to be about 51, and a* and b* values, expressing differences in saturation, were each independently measured as positive values close to 20. This indicates that dyes, the color-expressing foreign substances, are not easily removed during the purification process based on physical filtration and recrystallization of the product.

Figure 10:
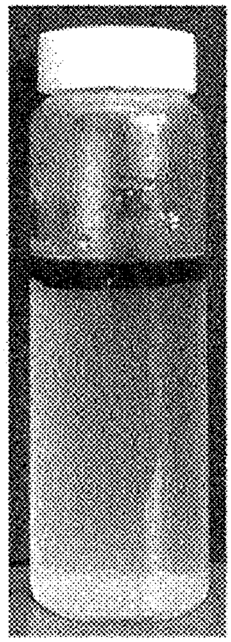
FIG. 10 shows an image where a prepared reaction mixture is separated into an aqueous solution layer and an organic phase layer containing most extractant and foreign substances, the images provided for demonstrating a method for removing color-expressing foreign substances on the basis of layer separation of the reaction mixture.

In Example 36, depolymerization was performed in the same manner as in Comparative Example 24, except for using the waste clothing raw material partially free of the color-expressing foreign substances by being in contact with anisole maintained at 110° C. for 10 minutes according to the extraction and washing processes in Example 9. The yield of BHET obtained after the reaction was measured to of the color-expressing foreign substances were distributed to the upper layer (organic phase layer) at a high concentration was confirmed. Such asymmetrical distribution of the color-expressing foreign substances was able to be visually identified. FIG. 10 shows one example of phase separation occurring in the process of purifying the reaction mixture prepared according to the process of Example 37.

As shown in FIG. 10, the aqueous solution phase from which the organic phase where the color-expressing foreign substances were concentrated at a high concentration was separated was taken and then left at a low temperature (4° C.) for a long time to crystallize the monomers, followed by recovering and drying the recrystallized monomers to obtain white high-purity BHET.

In the case where the BHET obtained by the extraction process is contaminated by the color-expressing substances, when adding a small amount of extractant and water heated to 90° C. or higher in a similar ratio again to obtain a high-purity product and using the method for repeatedly performing the liquid-liquid extraction process described above, most residues of the foreign substances may be effectively removed.

The BHET obtained after the depolymerization and purification process of Example 37 was formed into a pellet for measurement using a spectrophotometer. As a result, the sample was measured to have a color close to pure white with a lightness value L* of 94.6 and a* and b* values measured as absolute values of 0.5 or less, as shown in Table 7 above. When applying a series of procedures shown in Example 37 to a commercial process for chemical regeneration of colored polyesters, polyester polymers from which most color-expressing foreign substances are removed through pretreatment may be used as raw materials for depolymerization. In addition, depolymerization may be performed without reducing the yield by directly using the polyester polymers as raw materials for chemical regeneration processes without additionally removing extractants. Furthermore, after completion of the reaction, color-expressing foreign substances may be effectively removed. Through this, a highly economical process of preparing monomers capable of reducing purification costs may be implementable.

Specific aspects of the present disclosure have been described in detail above, and those skilled in the art will appreciate that these specific aspects are only preferred embodiments, and the scope of the present disclosure is not limited thereby. Thus, the substantial scope of the present disclosure will be defined by the appended claims and their equivalents.

The invention claimed is:

1. A method for removing disperse dye from a colored polymer containing an ester functional group, comprising:

heating an extractant to a temperature of 70° C. to 200° C. and bringing the extractant into direct contact with the colored polymer containing the ester functional group, thereby eluting the disperse dye from the colored polymer containing the ester functional group; and after the eluting the disperse dye from the colored polymer containing the ester functional group, recovering the extractant from an extraction mixed solution by a method comprising distillation, wherein the extraction mixed solution comprises the extractant and an extracted portion of the disperse dye, the extractant comprises one or more compounds represented by at least one of Formula 1 or Formula 2,

[Formula 1]

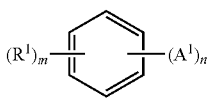

[Formula 2]

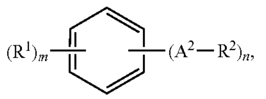

wherein, in Formula 1, $A^1$ is selected from among a carboxy group, an aldehyde group, and a nitrile group, $R^1$ is any one selected from among hydrogen, a hydroxy group, an ether group, an aldehyde group, a carboxy group, an alkyl group having 1 to 6 carbon atoms, a cycloalkyl group having 4 to 6 carbon atoms, and an aryl group having 6 to 12 carbon atoms, the m is any one integer selected from 0 to 5, when m is 2 or greater, each $R^1$ is the same or different, n is any one integer selected from 1 to 6, when n is 2 or greater, each $A^1$ is the same or different, wherein, in Formula 2, $A^2$ is at least one selected from among an ether group and a carbonyl group, $R^2$ is an alkyl group having 1 to 10 carbon atoms, n is any one integer selected from 1 to 6, wherein when the n is 2 or greater, $A^2$ and $R^2$ is each independently the same or different, and other definitions of $R^1$ and m are same as those in Formula 1 above.

2. The method of claim 1, wherein the eluting the disperse dye from the colored polymer containing the ester functional group includes:

heating an extraction mixed solution comprising the disperse dye to provide a resulting vaporized extractant, and the resulting vaporized extractant is continuously refluxed and resupplied so that a refluxed liquid-phased extractant is allowed to keep being in continuous contact with the polymer containing the ester functional group.

3. The method of claim 1, wherein the bringing the extractant into direct contact with the colored polymer containing the ester functional group is performed at a temperature lower than a boiling point of the extractant by a value of about 0° C. to 50° C.

4. The method of claim 1, wherein the one or more compounds represented by at least one of Formula 1 or 2 comprises one or more selected from the group consisting of methoxybenzene, 1,2-dimethoxybenzene, 1,3-dimethoxybenzene, 1,4-dimethoxybenzene, 1,2,3-trimethoxybenzene, 1,2,4-trimethoxybenzene, 1,3,5-trimethoxybenzene, 1,2,3,4-tetramethoxybenzene, 1,2,3,5-tetramethoxybenzene, 1,2,4,5-tetramethoxybenzena, 2-methoxyphenol, 1,3-dimethoxy-2-hydroxybenzene, 4-hydroxy-3,5-dimethoxybenzoic acid, 3-(4-hydroxy-3,5-dimethoxyphenyl)prop-2-enal, 4-hydroxy-3,5-dimethoxybenzaldehyde, 4-hydroxy-3,5-dimethoxyacetophenone, 3-(4-hydroxy-3,5-dimethoxyphenyl-prop-2-enoic acid, 4-enyl-2,6-dimethoxyphenol, 4-hydroxy-3-methoxybenzaldehyde, 3-hydroxy-4-methoxybenzaldehyde, 2-hydroxy-3-methoxybenzaldehyde, 2-hydroxy-5-methoxybenzaldehyde, 2-hydroxy-4-methoxybenzaldehyde, 3,4-dihydroxybenzaldehyde, 1-methoxy-4-[(E)-prop-1-enyl]benzene, 2-tert-butyl-4-methoxyphenol, ethoxybenzene, 4-(prop-2-en-1-yl) phenol, 1-methoxy-4(prop-2-en-1-yl) benzene, 5-(prop-2-en-1-yl)-2H-1,3-benzodioxol, 4-methoxy-2-[(E)-prop-1-yl]phenol, 2-methoxy-4-(prop-1-en-yl) phenol, 2-methoxybenzoic acid, 3-methoxybenzoic acid, 4-methoxybenzoic acid, ethyl 2-methoxybenzoic acid, ethyl 3-methoxybenzoic acid, 4-hydroxybenzoic acid, 3,4-dihydroxybenzoic acid, salicylic acid, vanillic acid, methyl benzoate, ethyl benzoate, propyl benzoate, butyl benzoate, benzyl benzoate, phenethyl benzoate, 4-acetylbenzonitrile, acetophenone, methoxyacetophenone, propiophenone, butyrophenone, benzaldehyde, 4-methylbenzaldehyde, hydroxybenzaldehyde, anisaldehyde, 2-methoxyanisaldehyde, 3-methoxyanisaldehyde, benzonitrile, hydroxybenzonitrile, 3,4-dihydroxybenzonitrile, p-tolunitrile, and methoxybenzonitrile.

5. The method of claim 1, wherein the colored polymer containing the ester functional group shows a color on the basis of the one or more disperse dye, and the extractant does not modify a basic form of the polymer while selectively separating only the disperse dye.

6. The method of claim 1, of wherein the colored polymer containing the ester functional group is a single colored polymer containing an ester functional group, or the colored polymer containing the ester functional group is a mixed resin, the mixed resin includes the colored polymer containing the ester functional group the mixed resin further includes one or more among polyethylene, polypropylene, polystyrene, polyvinyl chloride, cotton, linen, wool, rayon, acetate, acryl, nylon, and spandex.

7. The method of claim 1, wherein the compound represented by Formula 1 or 2 comprises one or more selected from the group consisting of methoxybenzene, 1,2,3-trimethoxybenzene, 1,2,4-trimethoxybenzene, 1,3,5-trimethoxybenzene, 1,2,3,4-tetramethoxybenzene, 1,2,3,5-tetramethoxybenzene, 1,2,4,5-tetramethoxybenzene, 2-methoxyphenol, 1,3-dimethoxy-2-hydroxybenzene, 4-hydroxy-3,5-dimethoxybenzoic acid, 3-(4-hydroxy-3,5-dimethoxyphenyl)prop-2-enal, 4-hydroxy-3,5-dimethoxybenzaldehyde, 4-hydroxy-3,5-dimethoxyacetophenone, 3-(4-hydroxy-3,5-dimethoxyphenylprop-2-enoic acid, 4-enyl-2,6-dimethoxyphenol, 4-hydroxy-3-methoxybenzaldehyde, 3-hydroxy-4-methoxybenzaldehyde, 2-hydroxy-3-methoxybenzaldehyde, 2-hydroxy-5-methoxybenzaldehyde, 2-hydroxy-4-methoxybenzaldehyde, 3,4-dihydroxybenzaldehyde, 1-methoxy-4-[(E)-prop-1-enyl]benzene, 2-tert-butyl-4-methoxyphenol, ethoxybenzene, 4-(prop-2-en-1-yl) phenol, 1-methoxy-4(prop-2-en-1-yl)benzene, 5-(prop-2-en-1-yl)-2H-1,3-benzodioxol, 4-methoxy-2-[(E)-prop-1-yl] phenol, 2-methoxy-4-(prop-1-en-yl)phenol, 2-methoxybenzoic acid, 3-methoxybenzoic acid, 4-methoxybenzoic acid, ethyl 2methoxybenzoic acid, ethyl 3-methoxybenzoic acid, 4-hydroxybenzoic acid, 3,4-dihydroxybenzoic acid, salicylic acid, vanillic acid, phenethyl benzoate, 4-acetylbenzonitrile, 4-methylbenzaldehyde, hydroxybenzaldehyde, anisaldehyde, 2-methoxyanisaldehyde, 3-methoxyanisaldehyde, hydroxybenzonitrile, 3,4-dihydroxybenzonitrile, p-tolunitrile, and methoxybenzonitrile.

8. A method for selectively removing disperse dye from a colored polymer containing an ester functional group, comprising:

heating an extractant to a temperature of 70° C. to 200° C. and bringing the extractant into direct contact with the colored polymer containing the ester functional group, thereby eluting the disperse dye from the colored polymer; and wherein the colored polymer comprises a mixed resin including a polymer resin containing an ester functional group and at least one additional component selected from polyethylene, polypropylene, polystyrene, polyvinyl chloride, cotton, linen, wool, rayon, acetate, acrylic, nylon, and spandex; and wherein the extractant comprises one or more compounds represented by at least one of Formula 1 or Formula 2, wherein, in the course of the contact with the extractant, the disperse dye is selectively extracted from the colored polymer containing the ester functional group;

[Formula 1]

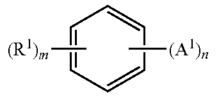

[Formula 2]

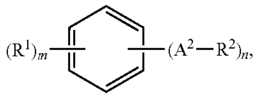

wherein, in Formula 1, $A_1$ is selected from among a carboxy group, an aldehyde group, and a nitrile group, $R_1$ is any one selected from among hydrogen, a hydroxy group, an ether group, an aldehyde group, a carboxy group, an alkyl group having 1 to 6 carbon atoms, a cycloalkyl group having 4 to 6 carbon atom, and an aryl group having 6 to 12 carbon atoms, the m is any one integer selected from 0 to 5, when m is 2 or greater, each $R_1$ is the same or different, n is any one integer selected from 1 to 6, when n is 2 or greater, each $A_1$ is the same or different, wherein, in Formula 2, $A_2$ is at least one selected from among an ether group and a carbonyl group, R2 is an alkyl group having 1 to 10 carbon atoms, n is any one integer selected from 1 to 6, wherein when the n is 2 or greater, $A_2$ and $R_2$ is each independently the same or different, and other definitions of $R_1$ and m are same as those in Formula 1 above.

* * * * *